(12) United States Patent
Farley et al.

(10) Patent No.: US 8,375,826 B1
(45) Date of Patent: Feb. 19, 2013

(54) SELF BALANCING CHOPPING OR THRESHING ROTOR

(75) Inventors: Herb M. Farley, Elizabethtown, PA (US); Kevin W. Ward, Lititz, PA (US); Nathan E. Isaac, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/326,934

(22) Filed: Dec. 15, 2011

(51) Int. Cl.
*F16F 15/22* (2006.01)
*G05G 1/00* (2006.01)
*G05G 3/00* (2006.01)

(52) U.S. Cl. .................... 74/570.2; 74/570.1; 460/61
(58) Field of Classification Search ............ 74/570.2, 74/570.1, 570.11, 572.4, 573.1; 460/71, 460/61, 111, 901; 241/292; 56/15.2
See application file for complete search history.

(56) References Cited

U.S. PATENT DOCUMENTS

| | | | |
|---|---|---|---|
| 1,254,694 A | | 1/1918 | Humphries |
| 1,314,005 A | | 8/1919 | Louden |
| 2,285,404 A | * | 6/1942 | Best ............................ 74/570.1 |
| 2,331,756 A | | 10/1943 | Zobel |
| 2,990,667 A | * | 7/1961 | Schwalm ........................ 56/294 |
| 3,141,485 A | * | 7/1964 | Bonner, Jr. et al. ........... 241/292 |
| 3,692,236 A | * | 9/1972 | Livshitz et al. ................. 494/20 |
| 3,733,923 A | | 5/1973 | Goodrich et al. |
| 3,799,619 A | | 3/1974 | LaBarber |
| 4,157,004 A | * | 6/1979 | van der Lely .................. 56/13.6 |
| 4,232,506 A | | 11/1980 | Studer |
| 4,270,550 A | | 6/1981 | Dasilva |
| 5,142,936 A | * | 9/1992 | McGale ........................ 74/570.2 |
| 5,941,133 A | | 8/1999 | Wierzba et al. |
| 6,210,099 B1 | * | 4/2001 | Hugbart et al. .................. 415/13 |
| 6,212,973 B1 | | 4/2001 | Sohn |
| 2002/0078790 A1 | * | 6/2002 | Trionfetti ..................... 74/573 F |
| 2004/0003678 A1 | | 1/2004 | Neubauer et al. |

* cited by examiner

*Primary Examiner* — Árpád Fábián-Kovács
(74) *Attorney, Agent, or Firm* — Michael G. Harms

(57) ABSTRACT

A rotary element and a rotary element balancing system of a combine harvester. The rotary element includes a rotary member that rotates during operation and one or more blade mount assemblies. The rotary element also includes one or more auto-balance assemblies mounted to the rotary member to compensate for a mass offset on the rotary element due to the one or more blade mount assemblies being dislodged or broken. The one or more auto-balance assemblies include one or more tracks and one or more spheres located inside the one or more tracks and in contact with first and second bearing race edges. Loads are transferred from at least one of the first bearing race edge and the second bearing race edge, when the rotary member rotates, to the one or more spheres that self-align within the track to compensate for the mass offset on the rotary element.

20 Claims, 19 Drawing Sheets

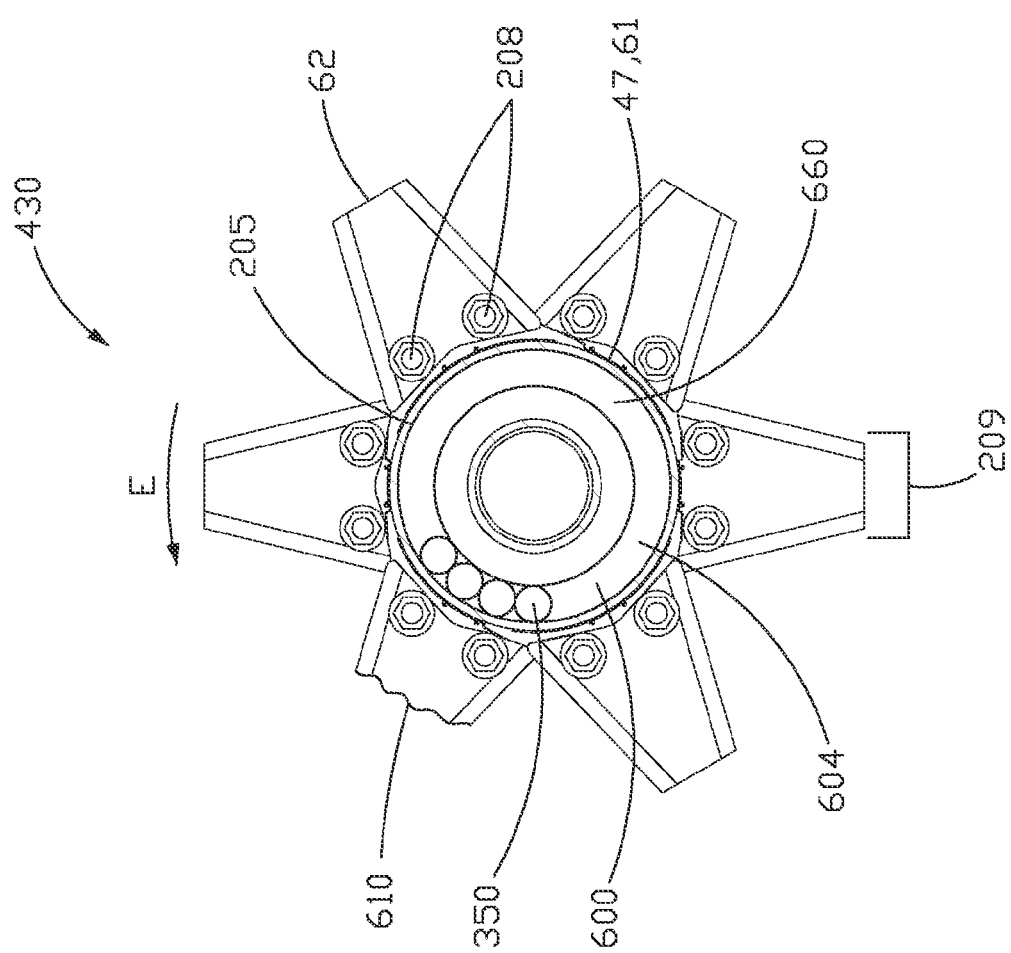

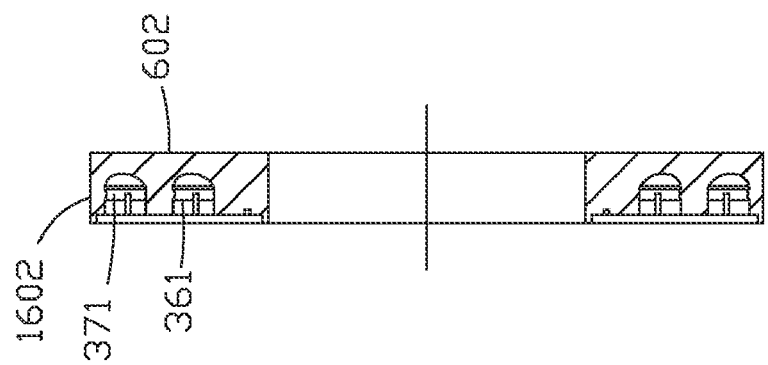
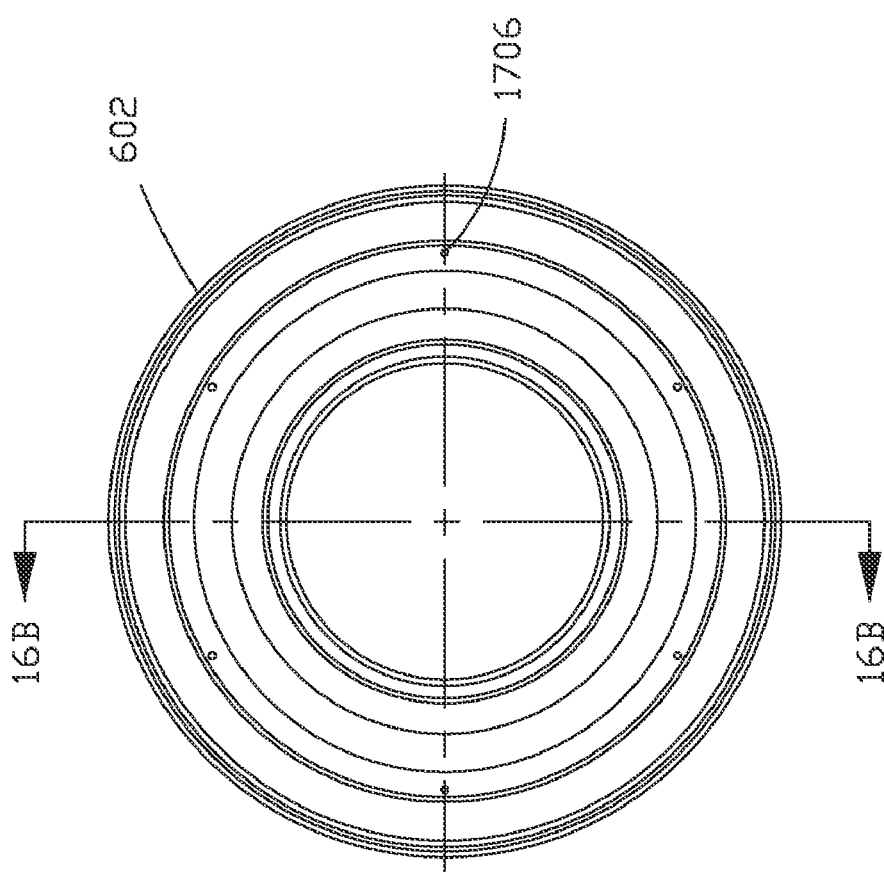
FIG. 16B
FIG. 16A

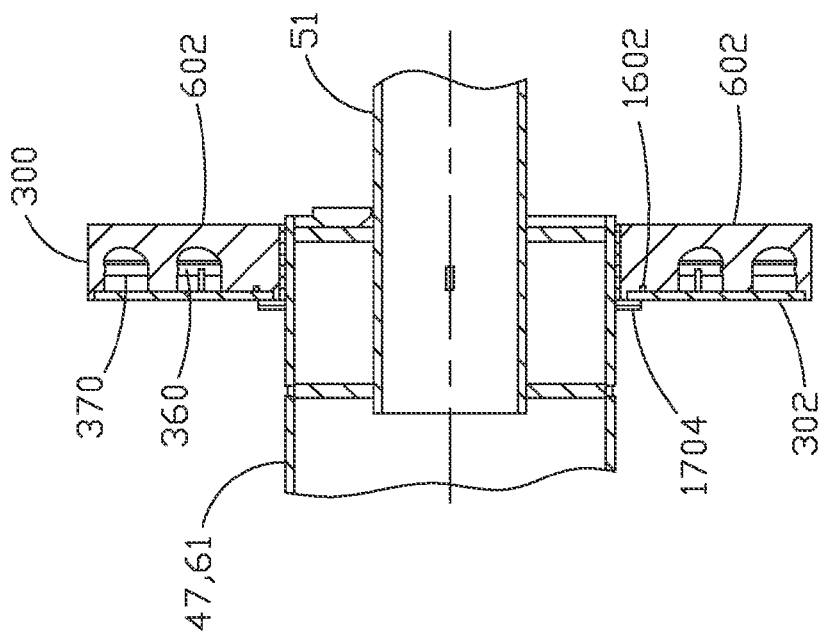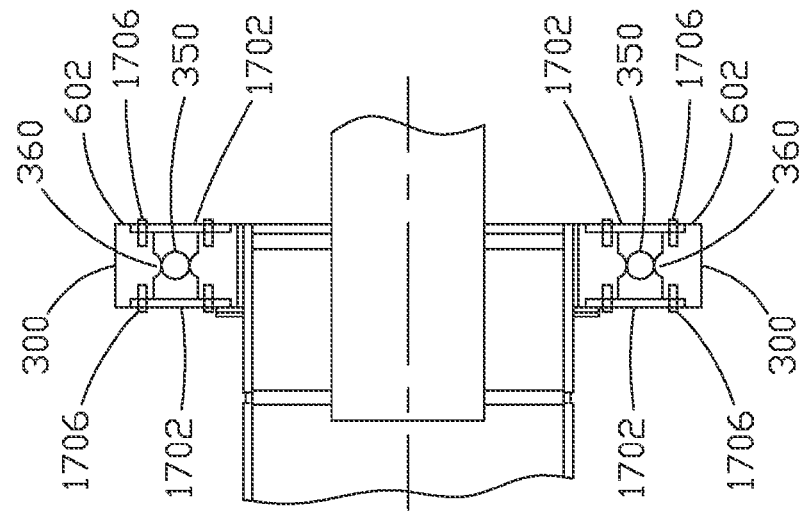

SELF BALANCING CHOPPING OR THRESHING ROTOR

TECHNOLOGY FIELD

The present disclosure relates generally to agricultural harvesting combines and machines and to straw and residue chopping systems therewith, and more particularly to an auto-balancing assembly for a rotary element of an integral or hood-mounted chopper assembly, the use of which allows for the auto-balancing assembly to reduce vibrations across the rotary element when components of the rotary element are damaged or broken off.

BACKGROUND

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. While such chopper and residue spreader assemblies have taken various forms, depending upon the desires of users and manufacturers, they may sometimes be identified as being of certain general types.

Many typical harvesters have traditionally employed technology and methods that have become associated with what is sometimes referred to as hood-mount choppers. Generally, such hood-mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer versatility not generally available with the hood-mounted chopper systems.

Such integral chopper systems have been so designed that, as noted hereinabove, their primary function is the transport of material away from the threshing system and a secondary function is the treatment of such material as it is being so transported. Such operations are usually effected in one of two different ways. Most commonly, the integral chopper system is operated to transport the material from the threshing system to a spreading system as a rotary element or portion rotates at or near 3000 RPM so as to quickly move the material rearward and to also chop it into smaller pieces as it is being so transported. Less commonly, the integral chopper system is operated to more gently transport the material from the threshing system to a spreading system as the rotary element operates at a much slower speed, typically at only about 800 RPM, with considerably less chopping activity.

The rotary element in either chopper system has a multitude of bolted elements serving function on or about the chopper element. Due to wear or foreign object ingestion, these functional elements can often be broken, damaged, or lost. Loss of mass from the rotating element causes imbalance during operation. Due to the critical timing of harvest and the relative location of parts to replace the damaged components, operation is demanded and continued. Under extended periods of operation with imbalance, severe chassis and component damage can occur.

What is needed is a device for a rotary element in a combine that may re-configure weight and offset load on or about the chopper element to return balance to the chopper element to remove undesired imbalance and vibrations during operation. This would minimize the possibility of structural failure and/or damage to the rotary element and/or combine.

SUMMARY

Embodiments of the present invention provide an auto-balancing assembly for a rotary element having a bearing construction with freely rotating spheres to seek and provide balance for a rotary element when an imbalance condition is present.

Embodiments of the present invention are directed to a rotary element of a combine harvester. The rotary element includes a rotary member. The rotary member is generally cylindrical and elongated and rotates during operation. The rotary element also includes one or more blade mount assemblies mounted to a surface about a circumference of the rotary member. The one or more blade mount assemblies include a lug attached to the surface of the rotary member and one or more blades. Each of the one or more blades is attached by one or more nut and bolt assemblies from a base of the blade to the lug. One or more edges of the blade extend up from the base of the blade and away from the lug to meet at a tip of the blade. The rotary element further includes one or more auto-balance assemblies mounted to the rotary member to compensate for a mass offset on the rotary element due to the one or more blade mount assemblies being dislodged or broken. The one or more auto-balance assemblies include one or more tracks running parallel in circumference to the attachment of the balance assembly with the rotary member. The track is located at a particular radial distance from the attachment of the balance assembly with the rotary member. Each track includes a first bearing race edge attached to the rotary member, a second bearing race edge attached to the rotary member and one or more spheres located inside the one or more tracks and in contact with the first bearing race edge and the second bearing race edge. Loads are transferred from at least one of the first bearing race edge and the second bearing race edge, when the rotary member rotates, to the one or more spheres. The one or more spheres self-align within the track to compensate for the mass offset on the rotary element.

According to one embodiment of the invention, the rotary element is a part of an integral chopper assembly.

According to one embodiment of the invention, the rotary element is a part of a hood-mounted chopper assembly.

According to one embodiment of the invention, the one or more auto-balance assemblies are donut shaped.

According to one embodiment of the invention, the one or more auto-balance assemblies are mounted from an outside circumferential edge of the donut shaped auto-balance assembly to an internal side of the surface about the circumference of the rotary member. The rotary member is hollow within the cylinder.

According to an aspect of one embodiment, the one or more auto-balance assemblies are mounted from an inside circumferential edge of the donut shape to an external side of the surface about the circumference of the rotary member.

According to an aspect of one embodiment, the one or more auto-balance assemblies is mounted to the rotary member by at least one of: one or more bolts; a press fit; and an adherent substance.

According to an aspect of one embodiment, the track includes a viscous film for the one or more spheres to move freely within the track without drag or without displacement.

According to an aspect of one embodiment, a composition of the one or more spheres is selected from at least one of: stainless steel; chrome steel; or ceramic.

According to one embodiment of the invention, the one or more spheres are replaced with one or more liquid masses.

According to an aspect of one embodiment, the one or more liquid masses include an oil. The one or more tracks enclose water for the one or more liquid masses to freely move within the track enclosing water.

According to one embodiment of the invention, the compensation of mass offset is greater when the radial distance is larger.

Embodiments of the present invention are also directed to a rotary element balancing system of a combine. The balancing system includes a rotary element. The rotary element is generally cylindrical and elongated and rotates during operation. The balancing system also includes one or more mass elements bolted to a surface about a circumference of the rotary element. The one or more mass elements are arranged on the surface of the rotary element. The rotary element is balanced with the arrangement of mass elements when the rotary element rotates. The balancing system further includes one or more auto-balance assemblies mounted to the rotary element to compensate for a mass loss offset and imbalance about the rotary element due to a removal or a brake of the one or more mass elements. The one or more auto-balance assemblies include a disc member having a unitary structure. The disc member includes one or more tracks running parallel in circumference to the attachment of the balance assembly with the rotary element. The track is located at a particular radial distance from the attachment of the balance assembly with the rotary element. The disc member also includes two bearing race edges on opposite sides of each track and attached to the rotary member. The disc member also includes one or more spheres located inside the one or more tracks and in contact with the first bearing race edge and the second bearing race edge. Loads are transferred from at least one of the first bearing race edge and the second bearing race edge, when the rotary member rotates, to the one or more spheres. The one or more spheres self-align within the track to compensate for mass offset and imbalance on the rotary element.

According to one embodiment of the invention, the one or more mass elements include one or more blade mount assemblies mounted to the surface of the rotary element. The one or more blade mount assemblies include a lug attached to the surface of the rotary member and one or blades. Each of the one or more blades is attached by one or more nuts and bolts from the base of the one or more blades to the lug. The one or more edges of the blade extend up from the base of the blade and away from the lug to meet at a tip of the blade.

According to one embodiment of the invention, the rotary element is a chopping rotary element.

According to one embodiment of the invention, the rotary element is a threshing rotary element.

According to one embodiment of the invention, two auto-balance assemblies are mounted at opposing ends of the rotary element.

According to one embodiment of the invention, the one or more auto-balance assemblies are donut shaped.

According to an aspect of one embodiment, at least one of the one or more auto-balance assemblies are mounted from an outside circumferential edge of the donut shaped auto-balance assembly to an internal side surface about the circumference of the rotary element. The rotary element is hollow inside the cylinder. The at least one of the one or more auto-balance assemblies are mounted from an inside circumferential edge of the donut shape to an external side of the surface of about the circumference the rotary member.

According to one embodiment of the invention, the one or more tracks include no spheres.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 15 illustrates the same end view of the rotary element from FIG. 13 with an internally mounted auto-balance assembly inside the rotary member and showing the blade mount assemblies extending out from the circumference of the rotary member with a blade damaged, in a rotary element in rotation with out-of-balance state, in at least one embodiment of the present invention.

FIG. 16A illustrates an exemplary disc member according to an exemplary embodiment.

FIG. 16B is a cross sectional view of disc member shown at FIG. 16A.

FIG. 17A illustrates a front cross sectional view of an exemplary mounted auto-balance assembly having two tracks according to an embodiment of the present invention.

FIG. 17B illustrates a front cross sectional view an exemplary mounted auto-balance assembly having a single track according to an embodiment of the present invention.

DETAILED DESCRIPTION OF ILLUSTRATIVE EMBODIMENTS

Figure 1:
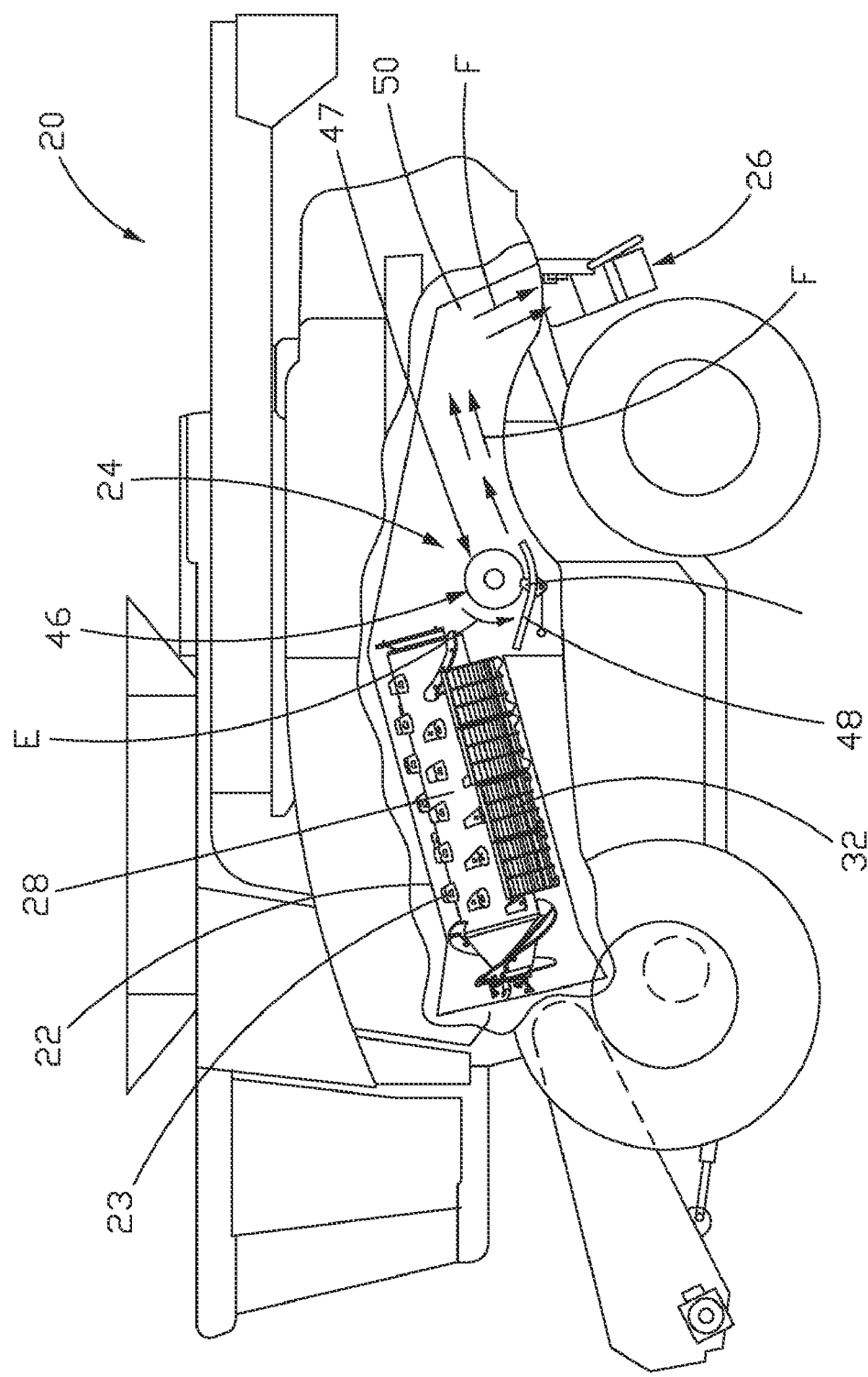
FIG. 1 illustrates a simplified side plan view, from the left side, of an agricultural combine, illustrating an axially arranged threshing system of the combine and an improved integral chopper assembly of the residue treatment and distribution system of the combine according to one embodiment of the present invention.

The problems in the prior art have motivated the creation of an auto-balancing assembly to balance a rotary chopper when mass elements of the rotary chopper are damaged or lost creating an imbalance on the rotary chopper during operation. Referring now to the drawings, wherein preferred embodiments of an auto-balancing assembly for a rotary chopper are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures.

Figure 2:
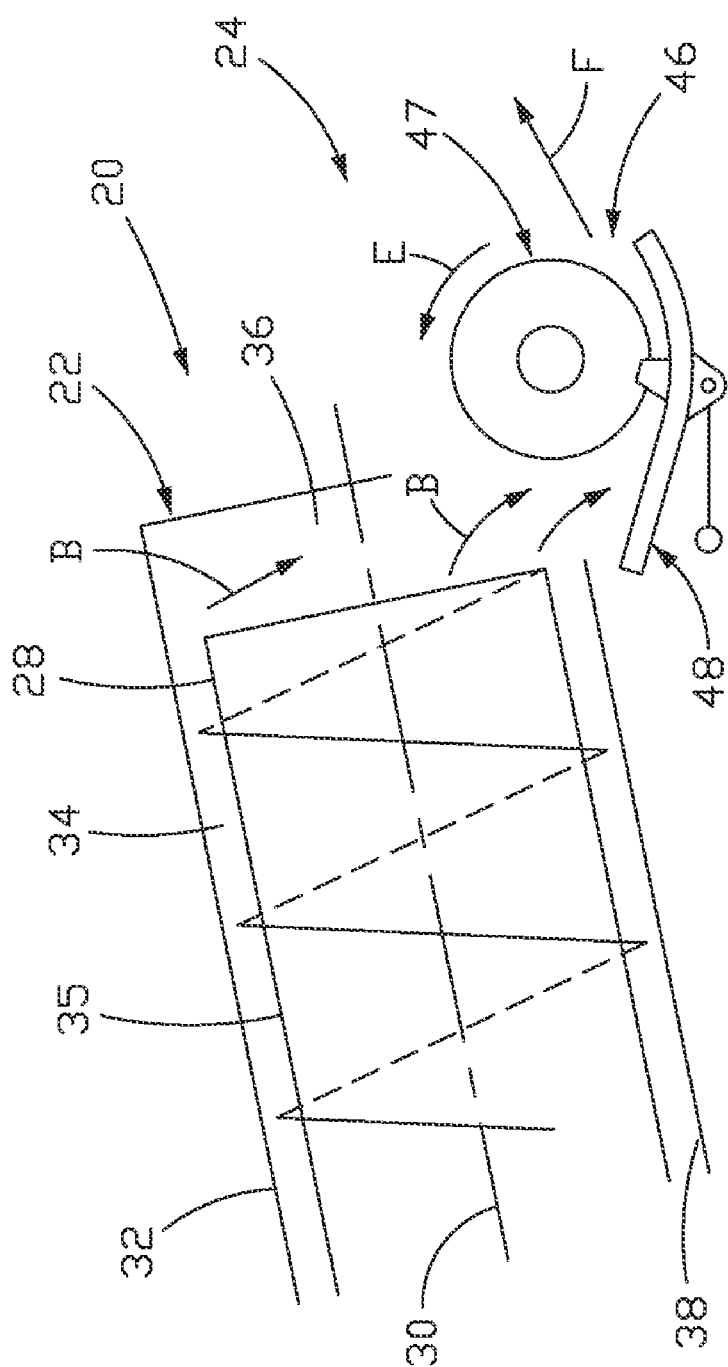
FIG. 2 illustrates a simplified side plan view, from the left side, of the threshing system and a portion of the crop residue treatment and distribution system of the combine of FIG. 1, according to one embodiment of the present invention.

FIGS. 1 and 2 depict a representative agricultural combine 20 that includes a longitudinally axially arranged threshing system 22 and a crop residue treatment and distribution system 24 with a crop residue spreader 26.

As can be generally and essentially observed from FIGS. 1-2, threshing system 22 is axially arranged in that it includes a cylindrical threshing rotor 28 conventionally supported and rotatable in a predetermined, typically clockwise direction, about a rotational axis 30 therethrough and within a concave 32, for conveying a flow of crop material in a helical flow path through a space 34 extending circumferentially around an outer cylindrical surface 35 of rotor 28 and an inner circumferential surface 38 of concave 32. Threshing mass elements 23 are arranged along the cylindrical threshing rotor 28, which may be bolted on the cylindrical threshing rotor 28. As the crop material is moved through space 34, the crop, such as grain, legumes, or the like, will be loosened and separated from crop residue such as husk and pods, and carried away therefrom.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 will typically include a transport and chopping assembly, such as integral chopper assembly 46, sometimes hereinafter referred to as rotary assembly 46 having a rotary element 47 rotatable in a direction E above a concave pan assembly such as chopper grate assembly 48. Rotary element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

Figure 3:
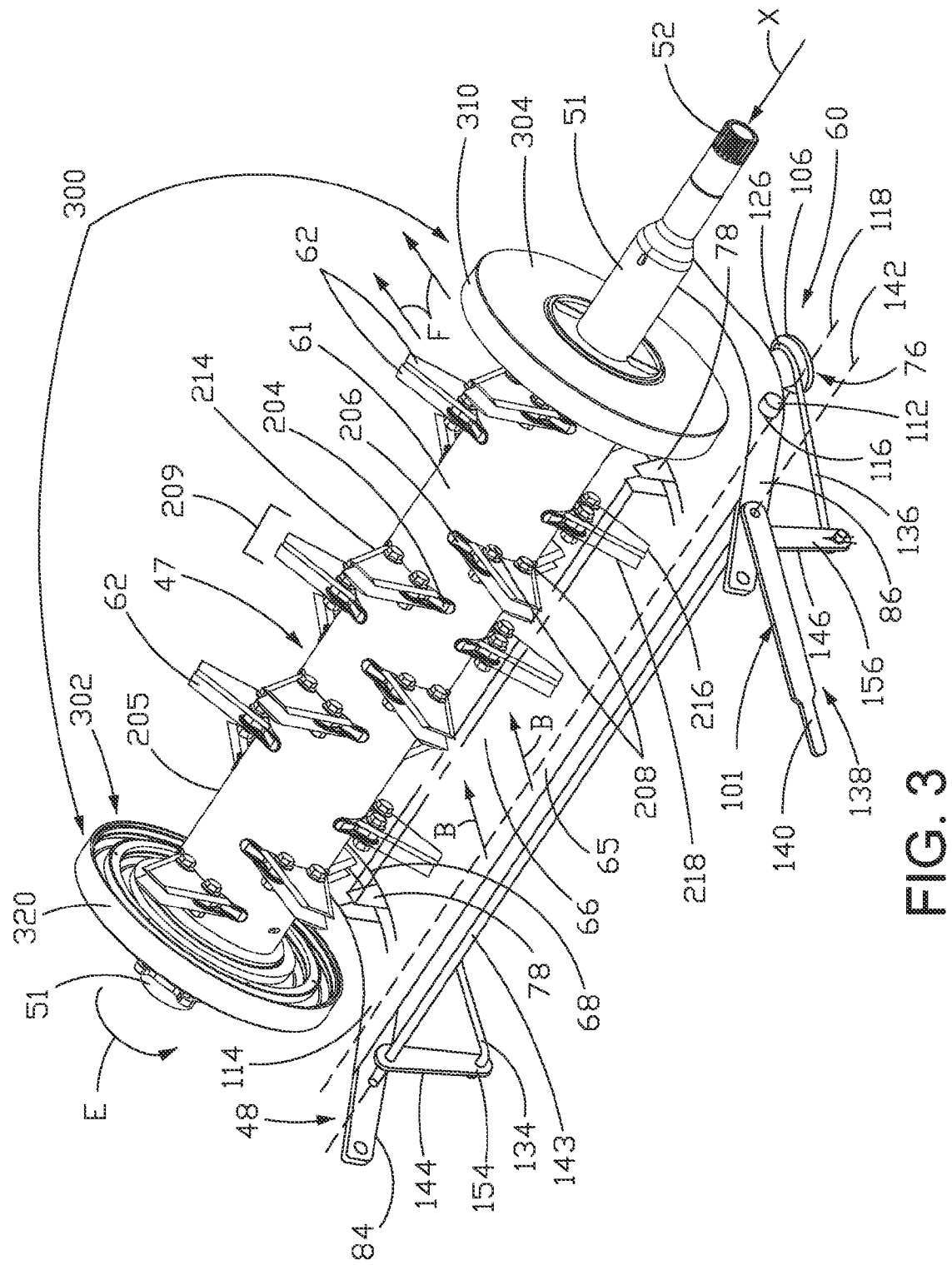
FIG. 3 illustrates a perspective view, from the left front side of a chopper assembly, depicting a counter knife assembly of the integral chopper assembly of FIGS. 1 and 2 with rotary element including externally mounted auto-balance assemblies according to one embodiment of the present invention.
Figure 4:
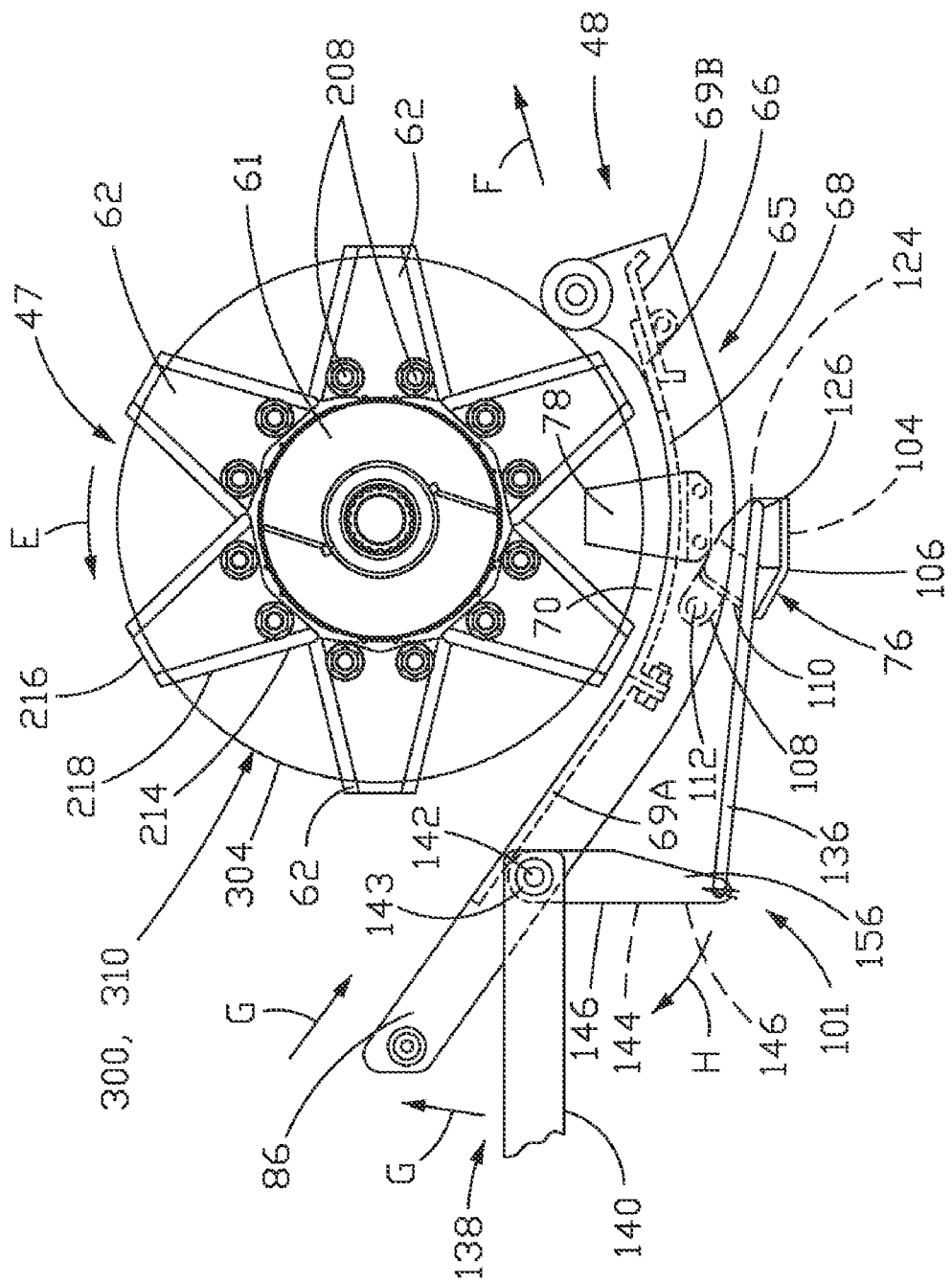
FIG. 4 illustrates a simplified left side plan view, generally viewed from position X in FIG. 3, of a portion of the integral chopper assembly of FIG. 3, with the perimeter of the foreground auto-balance assembly only shown for visibility of the chopper rotor element behind it according to one embodiment of the present invention.

In light of the foregoing, FIGS. 3-4 thus depict generally a portion of an integral chopper assembly 46 of FIG. 1 that includes not only a concave pan portion that employs a replaceable grate portion and an interruption plate downstream from the slots in the grate portion of the chopper grate assembly, but also various other features of note, including, as one feature, a rotary chopper portion or element 47 that extends generally horizontally across the flow path of the crop residue above the chopper grate assembly 48, which chopper grate assembly includes as a portion thereof the counter knife assembly 60. The rotary element 47 shown in FIG. 3 is a rotary chopper element. However, a rotary element may also be a rotary threshing element, including the cylindrical threshing rotor 28 shown in FIG. 1. Such rotary element 47, as shown in FIG. 3, includes a cylindrical element or like rotary member 61 which may be elongated, and has a number of paddles or knife blades 62, mounted or affixed to the rotary member 61 at a plurality of mounting locations distributed about its periphery. Knife blades 62 may be any size, for example the width may be 4 inches and the height 4 inches. Also shown, rotary chopper element 47 includes external mounted auto-balance assemblies 300, discussed further below.

Concave pan portion 65 includes a grate portion 66 that extends generally parallel to the rotary element 47 (as better shown in FIG. 3) with a plurality of spaced slots 68 therealong, the purpose and configurations of which slots 68 will be further addressed hereinafter, disposed between leading and trailing plate portions 69A and 69B. For purposes of clarity, not all of the slots in the grate portion 66, including especially a plurality of slots along and/or within the phantom lines in the central portion of the grate portion 66, are depicted in FIG. 3.

As may now be better observed from FIG. 4 wherein only the perimeter of foreground auto-balance assembly 310 is shown to make visible components of the rotary element 47, the rotary element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (FIG. 2). The slots 68 in grate portion 66 are generally elongated and extend along such grate portion 66 generally in the direction of the crop residue flow B. The externally mounted auto-balance assemblies 300 are further discussed below.

With reference, now, to all of FIGS. 3-4, counter knife assembly 60 includes a stationary knife bank 76 positioned generally beneath and parallel to both rotary element 47 and grate portion 66, having a plurality of spaced knife elements 78 therealong. Such knife elements 78 are mounted at positions along knife bank 76 generally alignable with slots 68 in grate portion 66 that are coordinately sized and configured to permit the knife elements 78 to be movable to project through slots 68.

Slots 68 and knife elements 78 are appropriately positioned relative to knife blades 62 of rotary element 47 to permit the knife elements 78 and knife blades 62 to be interengageable with one another, especially as rotary element 47 is rotated, so as to pass adjacent to one another without contacting one another. Such knife blades 62 and knife elements 78 are so mounted that they are interengageable with one another during a chopping operation without contacting or interfering with one another.

With reference again to FIGS. 3-4, the integral chopper assembly 46 therein depicted also preferably includes an adjustment mechanism 101 for adjustably varying the positioning of the knife bank assembly 76 relative to the grate portion 66 of the chopper grate assembly 48 between a fully engaged position wherein the knife elements 78 of the knife bank assembly 76 alignedly extend through the slots 68 of the grate portion 66 of the chopper grate assembly 48 at maximal projection and a fully refracted position wherein the knife elements 78 project minimally, if at all, through the slots 68. In such embodiment, knife bank 76, which extends between first and second knife bank end plates 104 and 106 thereof, with knife bank end plate 104 being behind and obscured by knife bank 106 in FIG. 4, is generally spaced from and parallel to both rotary element 47 and grate portion 66, extending in a journalled arrangement between opposed side wall or plates 84 and 86 of the concave pan portion 65.

As shown in FIG. 4, the counter knife bank 76, which is dimensioned to extend generally the width of the grate portion 66 between knife bank end plates 104 and 106, includes spaced mounting eyelets 108, along a side 110 thereof through which a shaft member 112 extends between journalled end connections 114 and 116 on the respective opposed side plates 84 and 86 of concave pan portion 65. Such shaft member 112, when so mounted through journalled end connections 114 and 116, defines an engagement positioning axis 118 (FIG. 3), sometimes hereinafter also referred to as swivel axis 118, about which knife bank 76 can be rotated in an arc-like movement.

Knife bank end plates 104 and 106 also include lower portions 124 and 126, with portion 124 being behind and obscured by portion 126 in FIG. 4, which are operatively connected, as better shown in FIG. 3, via respective positioning rods 134 and 136 to a lever assembly 138 which is operable to effect, through the coupled movement of positioning rods 134 and 136, a rotation of knife bank end plates 104 and 106 and the knife bank 76 journalled thereto about swivel axis 118, the consequence of which is the retraction of the knife elements 78 from the flow passageway 70 (FIG. 4). Lever assembly 138 includes an operable lever 140 coupled at axis 142 to a rotatable connecting rod 143 that extends between side plates or walls 84 and 86 of concave pan portion 65, which connecting rod 143 is attached to support links 144 and 146. Support links 144 and 146 are respectively connected to positioning rods 134 and 136.

With further reference to both FIGS. 3 and 4, when lever 140 is operated, as denoted by arrow G in FIG. 4, support links 144 and 146 are caused to rotate thereby effecting rotational movement of end portions 154 and 156 of support links 144 and 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are allowed to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage 70, such as to clear obstructions as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134 and 136 or, more directly, the swivel positioning of knife bank end plates 104 and 106, or even the placement of knife bank 76 closer or farther from grate portion 66. Such mechanisms and devices may be manually or automatically operable, including remotely by a user, such as from the cab of a combine, and may include various and sundry systems and components of well known construction for effecting the desired movements, placements, or positionings.

Figure 6:
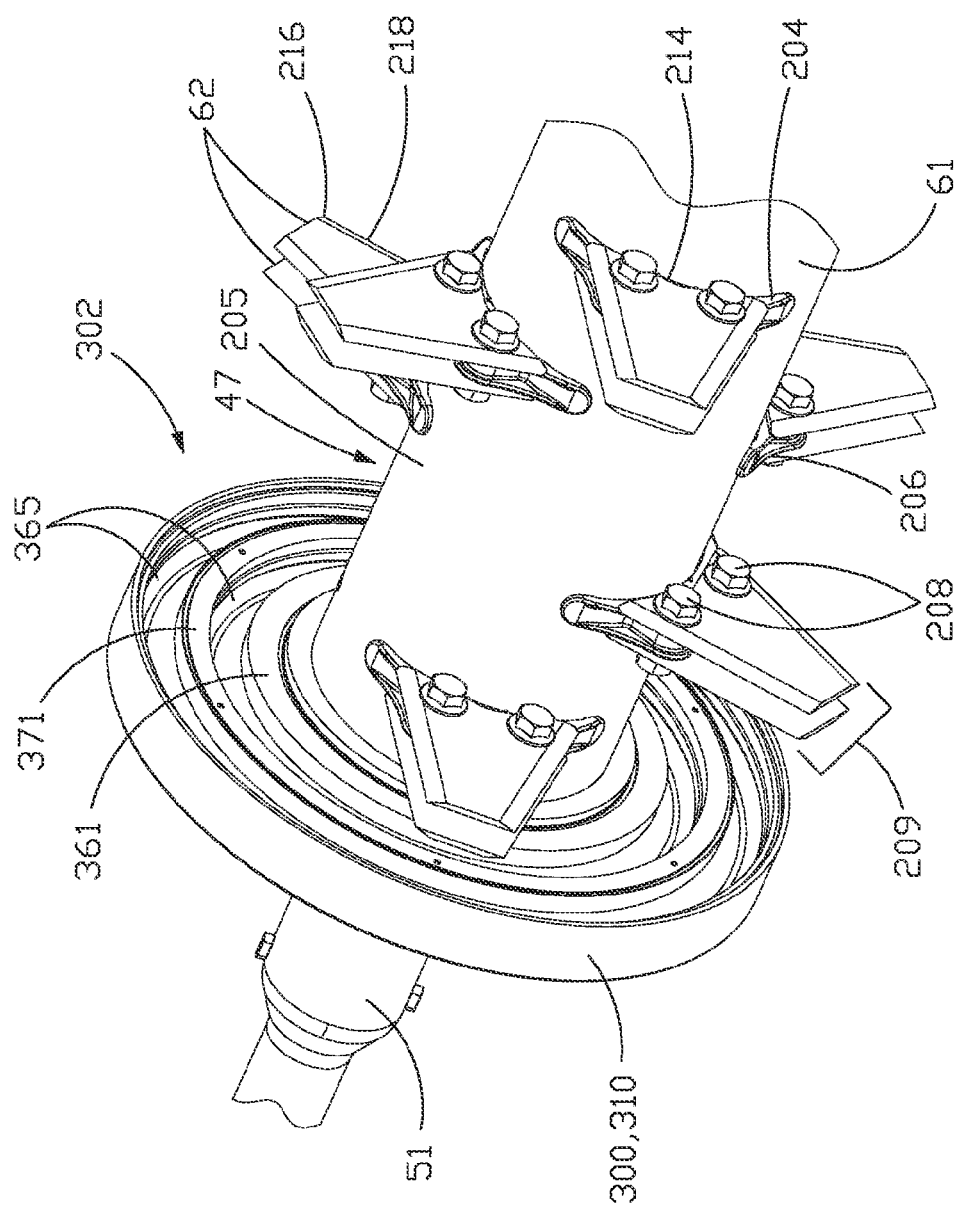
FIG. 6 illustrates a close-up of a perspective view of the rotary element at the foreground auto-balance assembly attachment according to at least one embodiment of the present invention.

Much of the discussion that now follows, particularly regarding FIGS. 3, 4, and 6, describes features and components of the integral chopper assembly and the operation thereof.

Knife blades or paddles may be disposed on the rotary member 61 in rows and columns, randomly, or in any other array configuration. One or more different blade configurations may be applied to the integral chopper assembly, including configurations with blade numbers of twenty, twenty-eight, fifty-six, forty, sixty, or one hundred and twenty. The twenty blade configurations may use a single blade mounted to a lug 204. The blade configurations of twenty-eight, fifty-six, forty, sixty, or one hundred and twenty may use a single or double blades mounted to a lug 204. In other embodiments, more than two blades may be mounted to a lug 204. In other embodiments, blade configurations may comprise any number of blades 62. In other embodiments, the blade number configuration may be based on the number of lugs 204 welded to the chopper rotary member 61.

As shown in FIG. 3 and in a closer view in FIG. 6, on rotary member 61 of rotary element 47, mounting lugs 204, sometimes hereinafter referred to more simply as lugs 204, are affixed, such as by welding, to the outer periphery 205 of rotary member 61 at spaced annular intervals that may be generally equal to one another. Lugs 204 placed in an array may be spaced at intervals between one another in the same plane along the circumference of the periphery 205, including but not limited to 120 degrees for three lugs 204, 90 degrees for four lugs 204, or 180 degrees for two lugs 204.

Each lug 204 is preferably designed to include a central yoke member 206 and extends around a portion of the rotary member 61 to which individual knife blades 62 that can be mounted, preferably in pairs, but also singly, or in other multiple numbers, if so desired. The individual knife blades 62 are shown connected to the lugs 204 by nut and bolt arrangements 208 to form a mounted assembly 209, although other connection techniques and constructions could be equally as well employed for such purpose and to like effect.

As may be better observed in FIG. 6, the individual knife blades 62 are beveled from their bases 214 to their tips 216 to form cutting edges 218 of which may be serrated. Cutting edges 218 on both sides permit easy reversibility of a blade on a mounting lug 204 when a leading cutting edge becomes dulled so that the still sharpened other side cutting edge can thereafter be utilized as the leading cutting edge.

In general, regardless of the particular knife blade and lug configurations, the leading edge of the mounted assembly 209 may be disposed to lie between the position of a perpendicular to the rotary member 61 and a tangent to the rotary member 61, i.e., at a rake angle $\epsilon$ where 0 degree.$<\epsilon\leqq$90 degree., although the height, as well as the leading edge design, of the lug 204 to which the blade 62 is attached may limit the maximum rake angle realizable, especially since it is desired that the leading edge of the mounted assembly 209 presented to the residue passing between the rotary element 47 and the chopper grate assembly 48 be beveled, preferably with the knife blade 62 forming the leading edge, to minimize hairpinning of residue against such leading edge.

Referring again to FIG. 3 and from previous discussions hereinabove, it should be appreciated that, when the counter knife assembly 60 is in an engaged position, with the knife elements 78 thereof projecting between slots 68 of the grate portion 66 of chopper grate assembly 48, with rotary member 61 being rotated at about 3000 RPM, the knife blades 62 on the rotary member 61 will thus serve to transport residue contacted thereby rapidly towards the rear of combine 10 and, while doing so, will also interact with the knife elements 78 of the counter knife assembly 60 to chop or cut the residue into smaller pieces. Alternatively, especially if the counter knife assembly is positioned in its retracted position, with the knife elements 78 thereof being retracted within slots 68 of the grate portion 66 of chopper grate assembly 48, with rotary member 61 being rotated at a lesser rate of about 800 RPM, the knife blades 62 on the rotary member 61 will likewise serve to transport residue contacted thereby towards the rear of combine 10, but more slowly and with less damage to the crop residue, as a consequence of which longer and larger pieces of residue will be transported rearwardly in combine 10.

An integral chopper, shown as rotary element 47, may have a clutch to permit one or more speeds. In this embodiment, the clutch may have two speeds, a slow and high speed. The slow speed may be 800 RPM and the high speed may be 3000 RPM. Both speeds may be utilized in both integral and hood-mounted chopper types. The speeds may also be various other RPMs.

As has been noted previously, there exists a possibility that a rock or other more solid object, or any other foreign object in the residue flow may impact a knife blade 62 as the residue passes between the rotary element 47 and the chopper grate assembly 48. The high impact force of a foreign object can damage the blade mount assembly 209, including the one or more knife blades 62 on the blade mount assembly 209. The possibility of resulting damage to the knife blades 62 includes the breaking off of such a knife blade or the breaking off or dislodging of the blade mount assembly 209 or portions of the blade mount assembly 209.

With the loss of mass from the surface of the rotary member 61 of the rotary element 47, an imbalance may occur on the otherwise reasonably displaced masses located thereon the rotary element 47, as the rotary member 61 is operated to rotate. The loss of mass may result in vibration of the rotary element 47. If combine 20 continues to operate with imbalance and vibration occurring across the rotary element 47, potentially resulting in vibrations elsewhere in the combine 20, then severe chassis and component damage in the combine 20 can occur.

Externally mounted auto-balance assemblies 300 are shown in FIG. 3 to rectify imbalance and vibration across the rotary element 47. A pair of externally mounted auto-balance assemblies 300, including a foreground auto-balance assembly 310 and background auto-balance assembly 320, are shown with each assembly of the pair mounted to opposing ends of the rotary element 47. The foreground auto-balance assembly 310 is shown mounted around the periphery of the rotary member 61 at the end of the rotary member 61 closest to the rotary shaft 51 having rotary shaft connector 52 shown in the foreground of FIG. 3. The background auto-balance assembly 320 is mounted around the periphery of the rotary member 61 on the opposing end. The externally mounted auto-balance assemblies 300 are disk shaped with an opening in the center, so as to resemble a donut in shape and the external composition of the assemblies 300 may be made of steel, plastic, other metals, and/or a combination of either. While steel may be preferred for precision machining the inner raceways and inner diameter of the ring to press fit onto the chopper, the cover plate could be of a rigid plastic or nylon material. The rings could also use cast steel with subsequent machining operations to make the precise dimensions. A steel casting could utilize various steel alloys for improved strength and durability. The auto-balance assemblies 300 are mounted externally so that the inside circumferential edge of the donut shaped auto-balance assembly 300 is mounted to the external side of surface of outer periphery 205 of rotary member 61.

The externally mounted auto-balance assemblies 300 may be mounted to the outer periphery 205 of the rotary member 61 by bolting, by press fit, and/or adhering, with an adherent substance, the assemblies 300 to the outer periphery 205. In other embodiments, one or more externally mounted auto-balance assemblies 300 may be mounted elsewhere on or about the rotary element 47. The one or more externally mounted auto-balance assemblies 300 may be mounted to various locations across or about the rotary element 47. For example, and as further described in FIG. 11, one externally mounted auto-balance assembly 300 may be mounted to one end of the rotary element. In other embodiments, one externally mounted auto-balance assembly 300 may be mounted more central on the rotary member 61. Blade mount assemblies 209 may be removed to provide for a location in which the externally mounted auto-balance assembly 300 may be mounted. In other embodiments, externally mounted auto-balance assemblies 300 may be mounted to ends of the rotary member 61 and centrally or anywhere along the rotary member 61. In other embodiments, the externally mounted auto-balance assemblies 300 may be any size diameter. For example the diameter may be sixty inches.

Referring again to FIG. 3, the externally mounted auto-balance assemblies 300 shown comprise a front and rear side to their disk shape. The front, or auto-balance assembly faceplate 304, of foreground auto-balance assembly 310, is shown in FIG. 3. The faceplate 304 may consist of material making the faceplate 304 opaque, transparent, or semi-transparent to view the components within. As shown in FIG. 3, the faceplate 304 is opaque. The rear side of externally mounted auto-balance assembly 300 is shown on background auto-balance assembly 320 as auto-balance assembly rearplate 302. The identical rearplate 302 of foreground auto-balance assembly 310 is shown in more detail at FIG. 6. The construction and shape of rearplate 302 is further discussed below.

Figure 5:
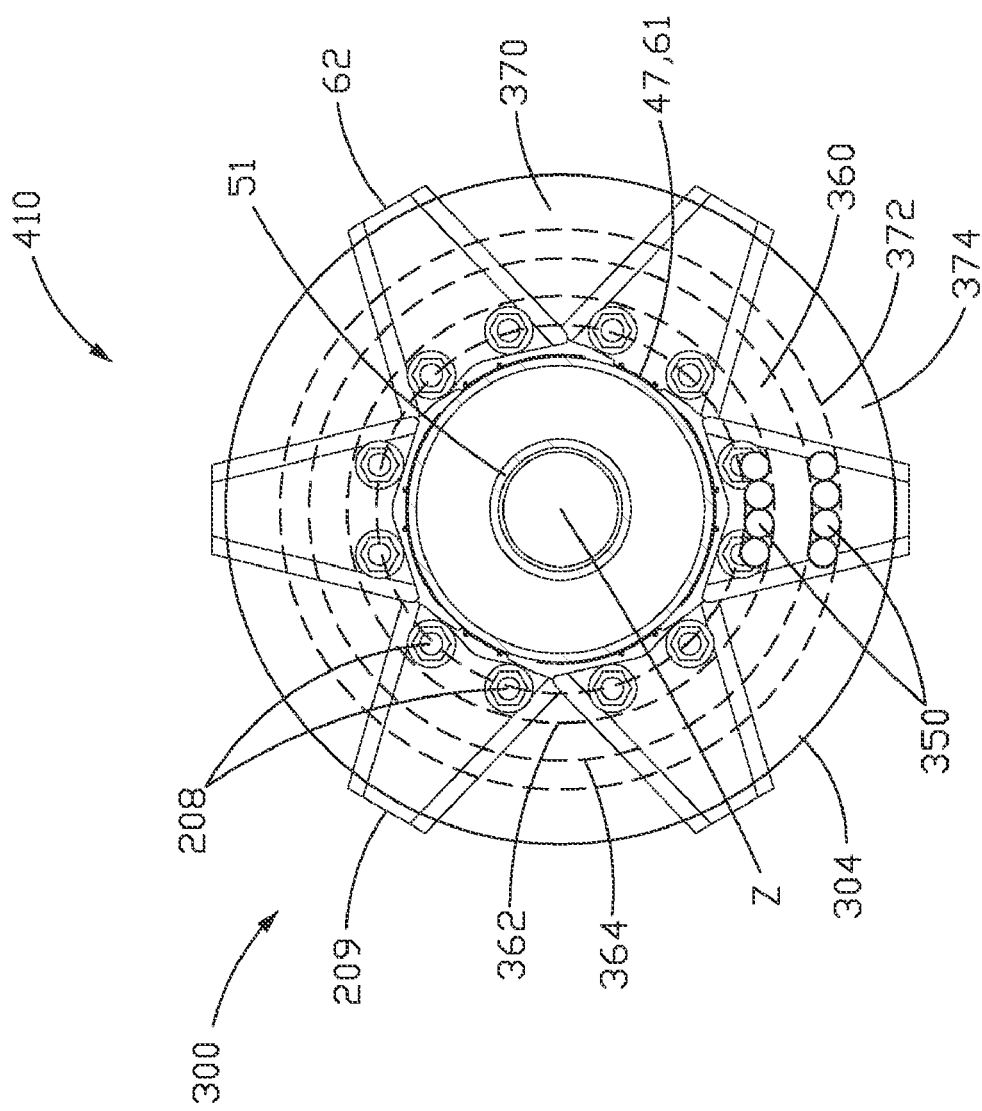
FIG. 5 illustrates an end view of the rotary element with the externally mounted auto-balance assembly shown with a transparent faceplate and rearplate to make visible the inner workings of the externally mounted auto-balance assembly and the blade mount assemblies in the background in at least one embodiment of the present invention.

FIG. 5 illustrates an end view of the rotary element 47 with the externally mounted auto-balance assembly 300 shown with a transparent faceplate 304 and rearplate 302 to make visible the inner workings of the externally mounted auto-balance assembly 300 and the blade mount assemblies 209 in the background in at least one embodiment of the present invention. The rotary element 47 and externally mounted auto-balance assembly 300 are shown in a rotary element at rest state 410.

As shown in FIG. 5, within the disk shape of the externally mounted auto-balance assembly 300 between faceplate 304 and rearplate 302, two tracks are shown. A ball bearing track one 360 is shown closer in radial distance along axis Z to the mounting of externally mounted auto-balance assembly 300 about rotary member 61. A ball bearing track two 370 is shown further in radial distance along axis Z than ball bearing track one 360 to the mounting of externally mounted auto-balance assembly 300 about rotary member 61. In the preferred embodiment and as shown in FIG. 5, each track contains four balance masses or spheres 350 shown as solid and not transparent. The spheres 350 may be of stainless steel. In other embodiments, the spheres 350 may be of chrome steel, ceramic, or made of other compositions. In other embodiments, the number of spheres 350 may vary.

The spheres 350 are capable of rolling about the tracks in a free rotating fashion. Tracks include two bearing races, or edges of the track, in which the spheres 350 contact the track at two opposing locations on the sphere 350. In ball bearing track one 360, spheres 350 contact track one 360 at the track one inner bearing race 362 and track one outer bearing race 364. The spheres 350 may be dynamically stabilized within the track with a viscous film in the track so as not to drag or bang into one another. The spheres 350 are capped within the track by a very close tolerance that allows the sphere 350 to freely progress around the track but yet not rattle or become displaced on the radial position.

FIG. 6 illustrates a close-up of a perspective view of the rotary element 47 at the foreground auto-balance assembly 310 according to one embodiment of the present invention. FIG. 6 shows the auto-balance assembly rearplate 302 of foreground auto-balance assembly 310. Between the inside edge of the foreground auto-balance assembly 310 mounted to the rotary member 61 and the opposing outer edge of the foreground auto-balance assembly 310 is a ball bearing track two rearside protrusion 371 and ball bearing track one rearside protrusion 361. The protrusions extend around their respective tracks located within the faceplate 304 and rearplate 302. Between each of the protrusions the rearplate 302 crimps in forming rear side valleys 365. In other embodiments, the rearplate 302 may be entirely flat like the faceplate 304 wherein the tracks may not be identifiable from viewing faceplate 304 and rearplate 302 of the auto-balance assembly 300.

Figure 6A:
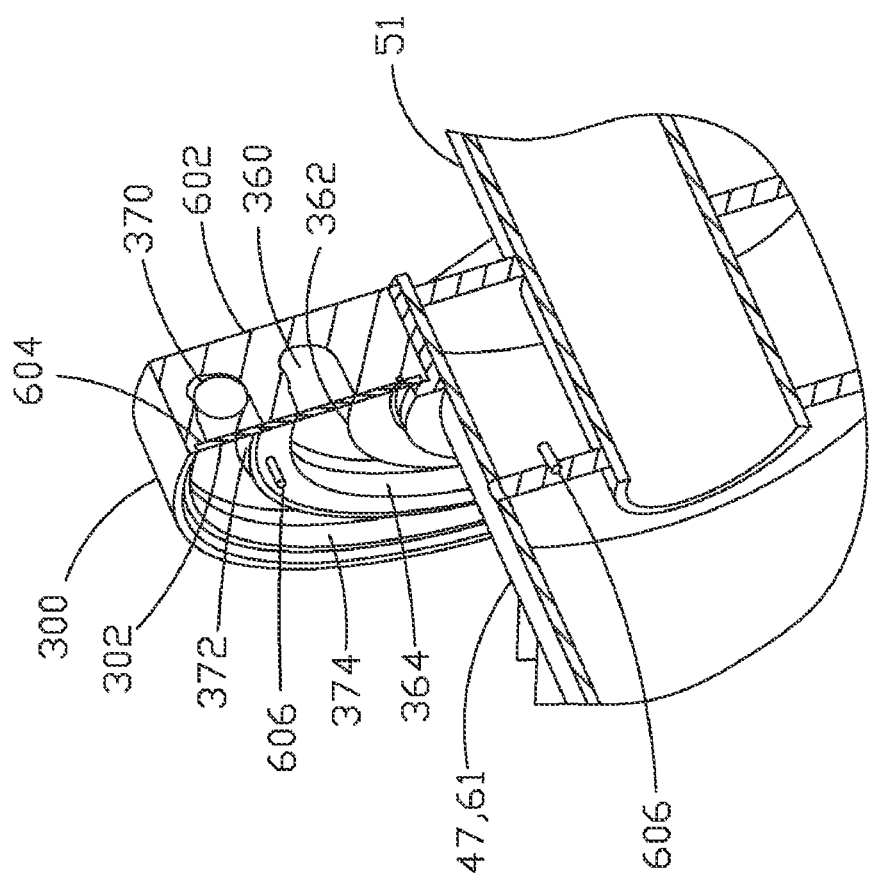
FIG. 6A and FIG. 6B illustrate cross sectional views of the exemplary auto-balance assembly shown at FIG. 6.
Figure 6B:
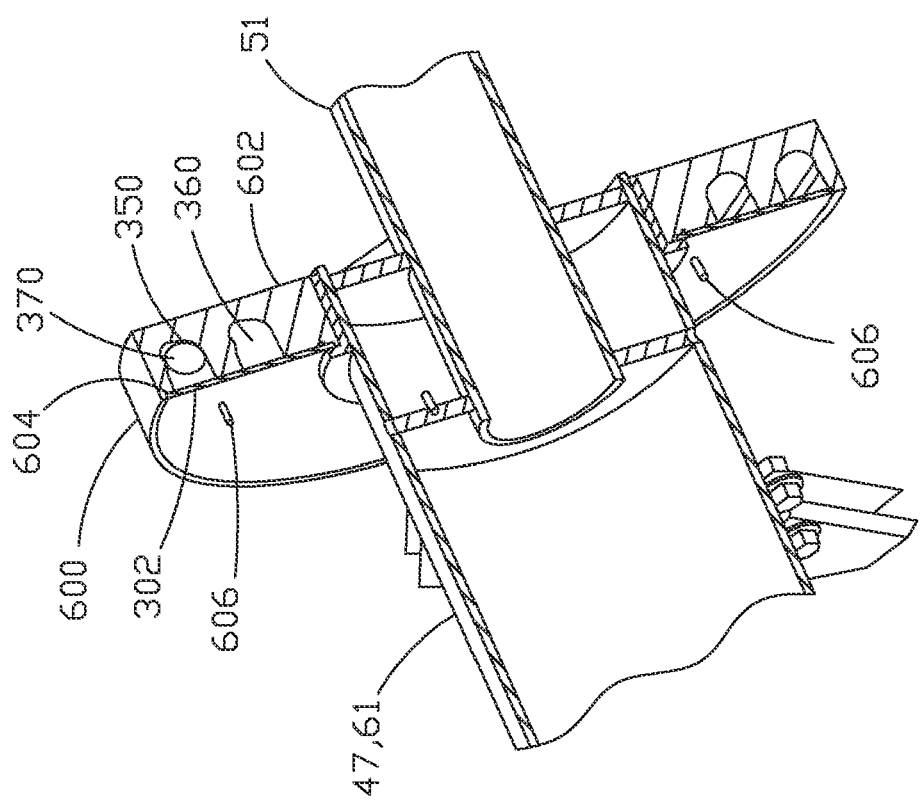

FIGS. 6A and 6B illustrate cross sectional views of the exemplary assembly 300 shown at FIG. 6. In the exemplary embodiment shown at 6A, disc member 602, is a unitary structure having bearing races edges 362, 364, 372, 374. The disc member 602, and therefore, the bearing race edges 362, 364, 372, 374, are rigidly attached to rotary member 61 and rotate simultaneously with the rotary member 61. In the disc member 602, the spheres 350 are captured between the bearing race edges 362, 364, 372, 374 and the loads are transferred to the spheres via the unitary structure of disc member 602. It is contemplated, however, that a disc member may be a composite structure that includes bearing races that move with respect to each other. Accordingly, assembly 300 may include bearing races rigidly attached to the rotary member 61 and other bearing races that are rotatably attached to the rotary member 61. In some embodiments, the bearing race of a track may rotate simultaneously with the rotary member 61 while the opposing bearing race of the track remains still.

As shown at FIG. 6A, assembly 300, which is attached to chopper rotor assembly 47, 61. FIG. 6A illustrates the balance assembly 300 with a transparent rearplate 302. FIG. 6B illustrates the balance assembly 300 with an opaque rearplate 302. The locations of coverplate 304 and rearplate 302 may be reversed. That is, the balance ring 300 may be installed onto the chopper assembly 47 with the rearplate 302 facing inward or outward for servicing the spheres 350. As shown at FIGS. 6A and 6B, assembly 300 includes disc member 602 with two tracks 360 (inner) and 370 (outer) configured for spheres 350 to move within. Tracks 360 and 370 may include a fluid (i.e. oil) for lubrication and or dampening. The assembly 300 also includes a removable rearplate 302, covering the exposed tracks 360 and 370. Rearplate 302 is configured to contact seals 604 for preventing fluid transferring between tracks 360 and 370 or leaking from the assembly 300. Rearplate 302 may also be secured to the disc member 602 with mounting hardware, such as screws 606. The assembly 300 may be configured with the cover plate 302 facing inward or outward.

The assembly 300 shown at FIG. 6A is configured such that the spheres 350 may contact the outer radial surface of each track 360 and 370 from centrifugal force acting upon the spheres 350 when the rotary member 47, 61 rotates. The acceleration force caused by a mass loss (such as a blade 62) may be transferred through disc member 602 and at least one of track protrusions 361 and 371 to at least one sphere 350 such that the sphere 350 will gravitate to a position that will counteract and neutralize the imbalance force.

FIG. 16A illustrates an exemplary disc member 602 according to an exemplary embodiment. FIG. 16B is a cross sectional view of disc member 602. As shown at FIG. 16B, disc member 602 includes protrusions 371 and 361 in each track 360 and 370 and grooves 1602 for a seal, such as an o-ring.

FIG. 17A illustrates a front cross sectional view of the mounted auto-balance assembly 300 according to one embodiment of the present invention. As shown at FIG. 17A, the balance ring has two tracks 360 and 370 within disc member 602, which may be secured (e.g. press fit) to sleeve 1704 on the chopper assembly 47. Mounted auto-balance assembly 300 may be configured to permit spheres 350 to rotate within tracks 360 and 370 to compensate for any mass loss on the chopper assembly 47.

FIG. 17B illustrates a front cross sectional view of balance ring assembly 300 on chopper assembly 47 according to another embodiment of the present invention. As shown at FIG. 17B, balance ring assembly 300 includes a single track 360. Further, balance ring assembly 300 includes an outer ring that is not continuously attached to an inner ring. Side cover plates 1702 are fastened via openings 1706 to both inner and outer rings such that the outer ring may rotate at the same angular velocity as the chopper assembly 47.

Referring again to FIG. 5, and in other embodiments, track one 360 and track two 370 may include any number of spheres. Track one 360 may include one or more spheres and track two 370 may include a different number of spheres. In other embodiments, either or both tracks may not include any spheres. For example, the auto-balance assembly 300 may be utilized for balancing with spheres 350 in only one of the two tracks. In other embodiments, only one track may be constructed within the externally mounted auto-balance assembly 300 and located at any radial distance along axis Z from the mounting of the externally mounted auto-balance assembly 300 with the rotary member 61. In other embodiments, three or more tracks may be constructed with in the externally mounted auto-balance assembly 300 and located at various radial distances along axis Z from the mounting of the externally mounted auto-balance assembly 300 with the rotary member 61.

In other embodiments, as an alternative to the spheres 350, various liquid forms of mass may be utilized. The tracks may then be enclosed to allow for the liquid mass to travel through a channel of another composition within the enclosed track. For example, a mass of oil may be free to travel about a track holding water or vice versa. Wherein the mass absorbs loads from imbalance along the rotary member 61. In other embodiments, one track may include spheres 350 for free rotations and any other track may include other mass forms for absorbing load.

As shown in FIG. 5, spheres 350 are located at the bottoms of track one 360 and track two 370 because the rotary member 61 is still and not moving in rotary element at rest state 410, thus spheres 350 are positioned due to gravity.

Figure 7:
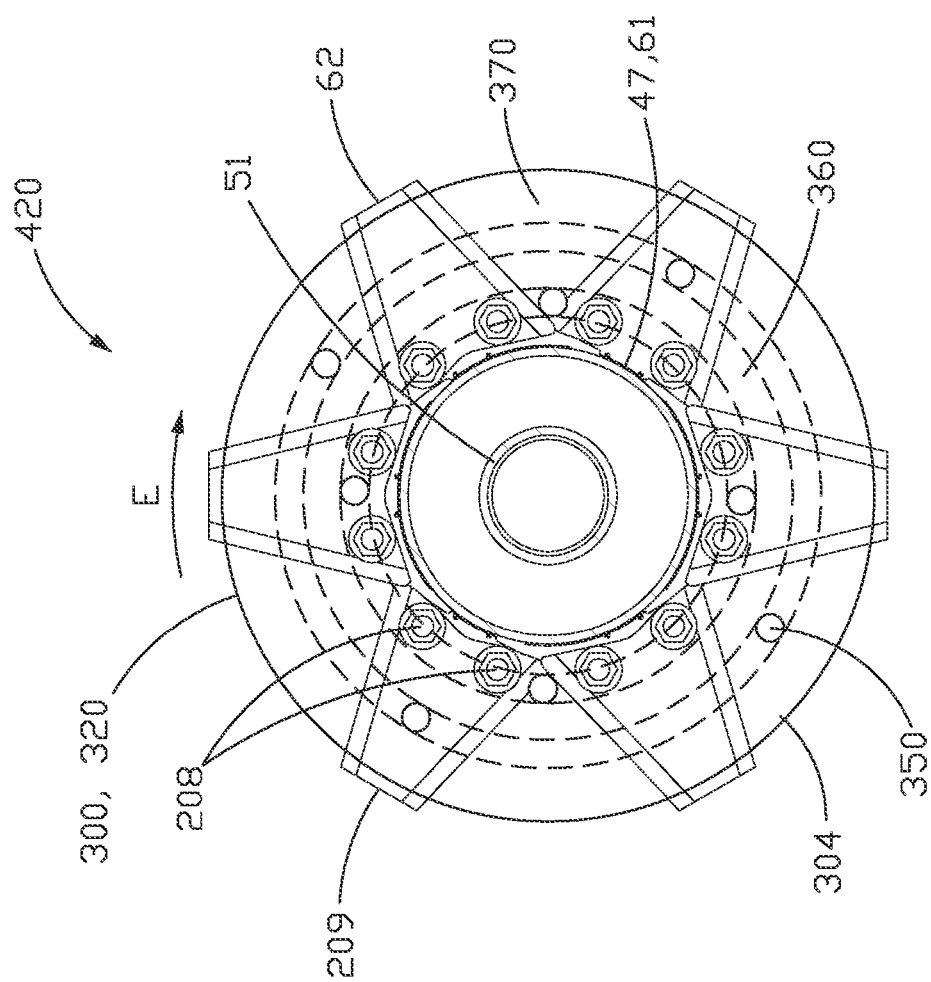
FIG. 7 illustrates an end view of the rotary element with the background auto-balance assembly shown with a transparent faceplate and rearplate to make visible the inner workings of the externally mounted auto-balance assembly and the blade mount assemblies in the background, in a rotary element rotation state, in at least one embodiment of the present invention.

FIG. 7 illustrates an end view of the rotary element 47 with the background auto-balance assembly 320 shown with a transparent faceplate 304 and rearplate 302 to make visible the inner workings of the externally mounted auto-balance assembly 300 and the blade mount assemblies 209 in the background, in a rotary element rotation state 420, in at least one embodiment of the present invention. As shown in FIG. 7, the rotary member 61 of rotary element 47 is rotating in direction E. None of the mounted assemblies 209 or knife blades 62 on the mounted assemblies 209 are shown damaged or dislodged. Thus, the rotary element 47 rotates without imbalance or vibration along rotary member 61. The spheres 350, rotating within track one 360 and track two 370, rotate freely at a distance apart from each other and do not self align with the rotary element 47 balanced.

Figure 8:
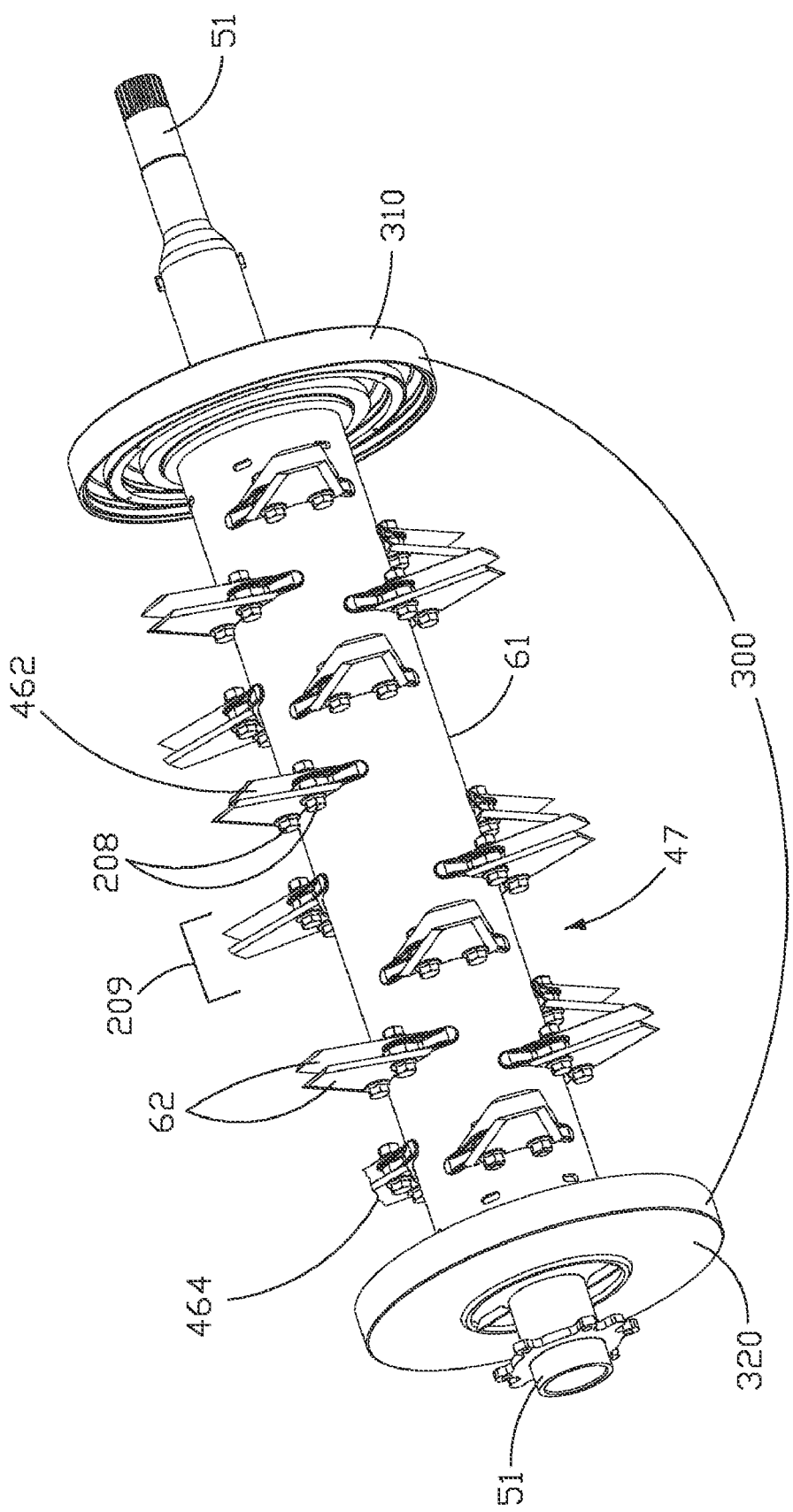
FIG. 8 illustrates a perspective view of the rotary element only with externally mounted auto-balance assemblies from the integral chopper assembly of FIG. 3 having broken knife blades according to at least one embodiment of the present invention.

FIG. 8 illustrates a perspective view of the rotary element alone from the integral chopper assembly of FIG. 3 having broken knife blades and including the externally mounted auto-balance assemblies according to at least one embodiment of the present invention. As shown in FIG. 8, a near-distance-from-background auto-balance assembly broken blades 464 is shown near or in proximity to the background auto-balance assembly 320. Also shown is far-distance-from-foreground auto-balance assembly broken blades 462 in proximity to the foreground auto-balance assembly 310 but at a further distance than the near-distance-from-background auto-balance assembly broken blades 464 from the background auto-balance assembly 320.

Figure 9:
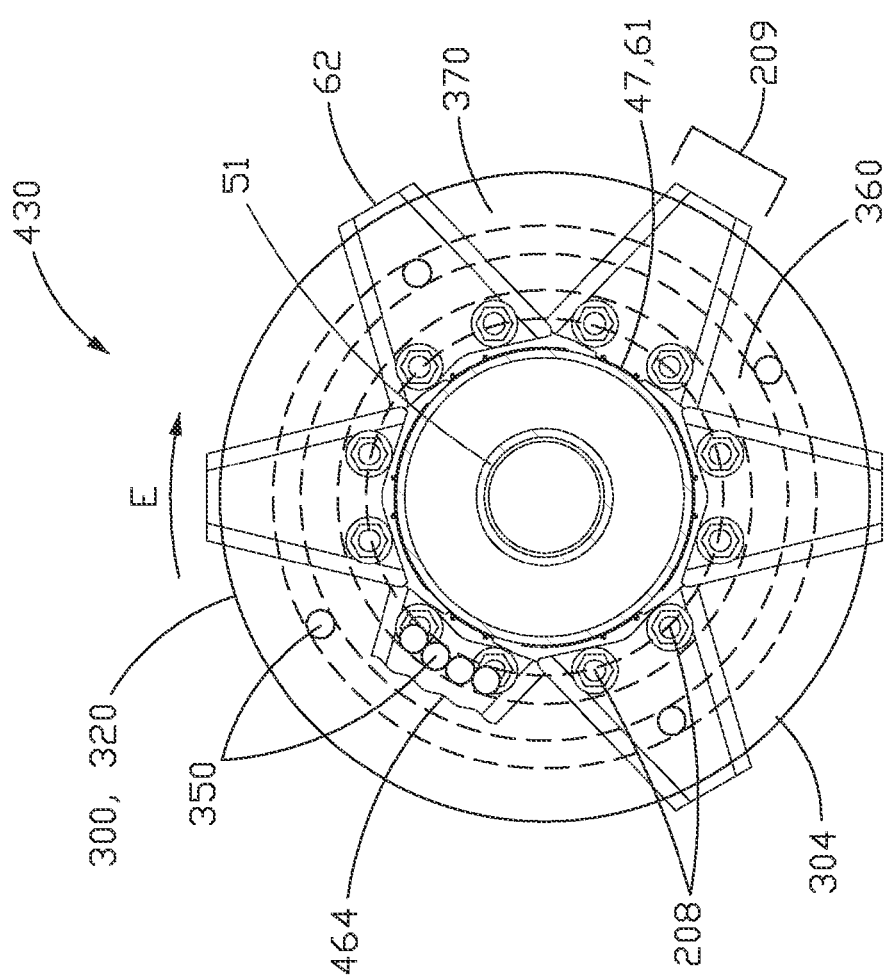
FIG. 9 illustrates an end view of the rotary element with the background auto-balance assembly shown with a transparent faceplate and rearplate to make visible the inner workings of the externally mounted auto-balance assembly and the blade mount assemblies in the background, in a rotary element in rotation with out-of-balance state, with the broken blades shown in FIG. 8, in at least one embodiment of the present invention.

FIG. 9 illustrates an end view of the rotary element 47 with the background auto-balance assembly 320 shown with a transparent faceplate 304 and rearplate 302 to make visible the inner workings of the externally mounted auto-balance assembly 300 and the blade mount assemblies 209 in the background, in a rotary element in rotation with out-of-balance state 430, with the broken blades shown in FIG. 8, in at least one embodiment of the present invention. As shown in FIG. 9, the rotary member 61 of rotary element 47 is rotating in direction E. Near-distance-from-background auto-balance assembly broken blades 464 are shown. The near-distance-from-background auto-balance assembly broken blades 464 cause an imbalance in loads over the rotary element 47 forming vibration along rotary member 61. The spheres 350 rotate to align in close proximity to one another in track one 360 to generate a compensation for mass offset for and in the general location of the near-distance-from-background auto-balance assembly broken blades 464. Spheres 350 in track two 370 rotate freely at a distance apart from each other and do not self align with the rotary element 47 balanced due to self aligning of spheres 350 in track one 360. Upon the loss of an attached mass element, such as the knife blades 62, the spheres 350 migrate to the point of imbalance inducing a state of improved balance allowing the operator to continue harvest without stopping the combine 20 (see FIG. 1) for repair. This protects the combine 20 from further accelerated damage due to the effects of chassis vibration.

It is contemplated that the spheres 350 may migrate to the point of imbalance in both inner and outer tracks simultaneously. It is also contemplated that the spheres 350 in the outer track 371 may migrate to the point of imbalance prior to the spheres 350 in the inner track 361 because they may have a higher centrifugal force acting upon them due to the greater radius of rotation. In some embodiments, spheres 350 may align in both tracks. For example, for a blade damage close to the externally mounted auto-balance assemblies 300 or if one blade is damaged directly behind another damaged blade in the same plane and parallel to one another from the externally mounted auto-balance assemblies 300 in direction X (see FIG. 3), then spheres 350 may align in track one 360 and track two 370 just above and below one another. The larger the radial distance of a track in the externally mounted auto-balance assemblies 300, the more mass offset that can be compensated by spheres 350 rotating in that track.

Figure 10:
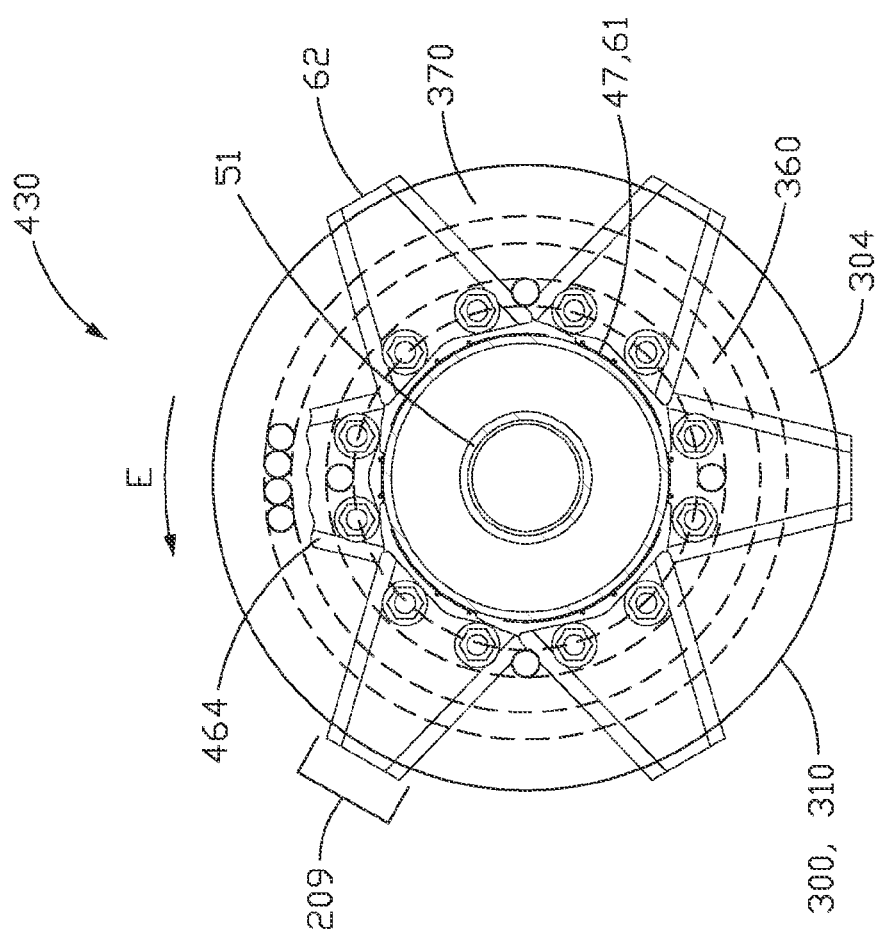
FIG. 10 illustrates an end view of the rotary element with the foreground auto-balance assembly shown with a transparent faceplate and rearplate to make visible the inner workings of the externally mounted auto-balance assembly and the blade mount assemblies in the background, in a rotary element in rotation with out-of-balance state, with the broken blades shown in FIG. 8, in at least one embodiment of the present invention.

FIG. 10 illustrates an end view of the rotary element 47 with the foreground auto-balance assembly 310 shown with a transparent faceplate 304 and rearplate 302 to make visible the inner workings of the externally mounted auto-balance assembly 300 and the blade mount assemblies 209 in the background, in a rotary element in rotation with out-of-balance state 430, with the broken blades shown in FIG. 6, in at least one embodiment of the present invention. As shown in FIG. 10, the rotary member 61 of rotary element 47 is rotating in direction E. Far-distance-from-foreground auto-balance assembly broken blades 462 are shown. The far-distance-from-background auto-balance assembly broken blades 462 cause an imbalance in loads over the rotary element 47 forming vibration along rotary member 61. The spheres 350 in foreground auto-balance assembly 310 rotate to align in close proximity to one another in track two 370 to generate a compensation for mass offset to the far-distance-from-foreground auto-balance assembly broken blades 462. Spheres 350 in track one 360 rotate freely at a distance apart from each other and do not self align with the rotary element 47 balanced by sphere 350 in track two 370.

In some embodiments, when damage occurs and mass is lost near the center of the rotary element 47, both the foreground auto-balance assembly 310 and background auto-balance assembly 310 may have a self aligning of spheres 350 to compensate for the same mass loss. In some embodiments, the number of spheres 350 in the auto-balance assembly 300 may compensate for at most the same number of mass losses. In other embodiments, the spheres 350 may still arrange to compensate for more number of mass losses than spheres 350.

Figure 11:
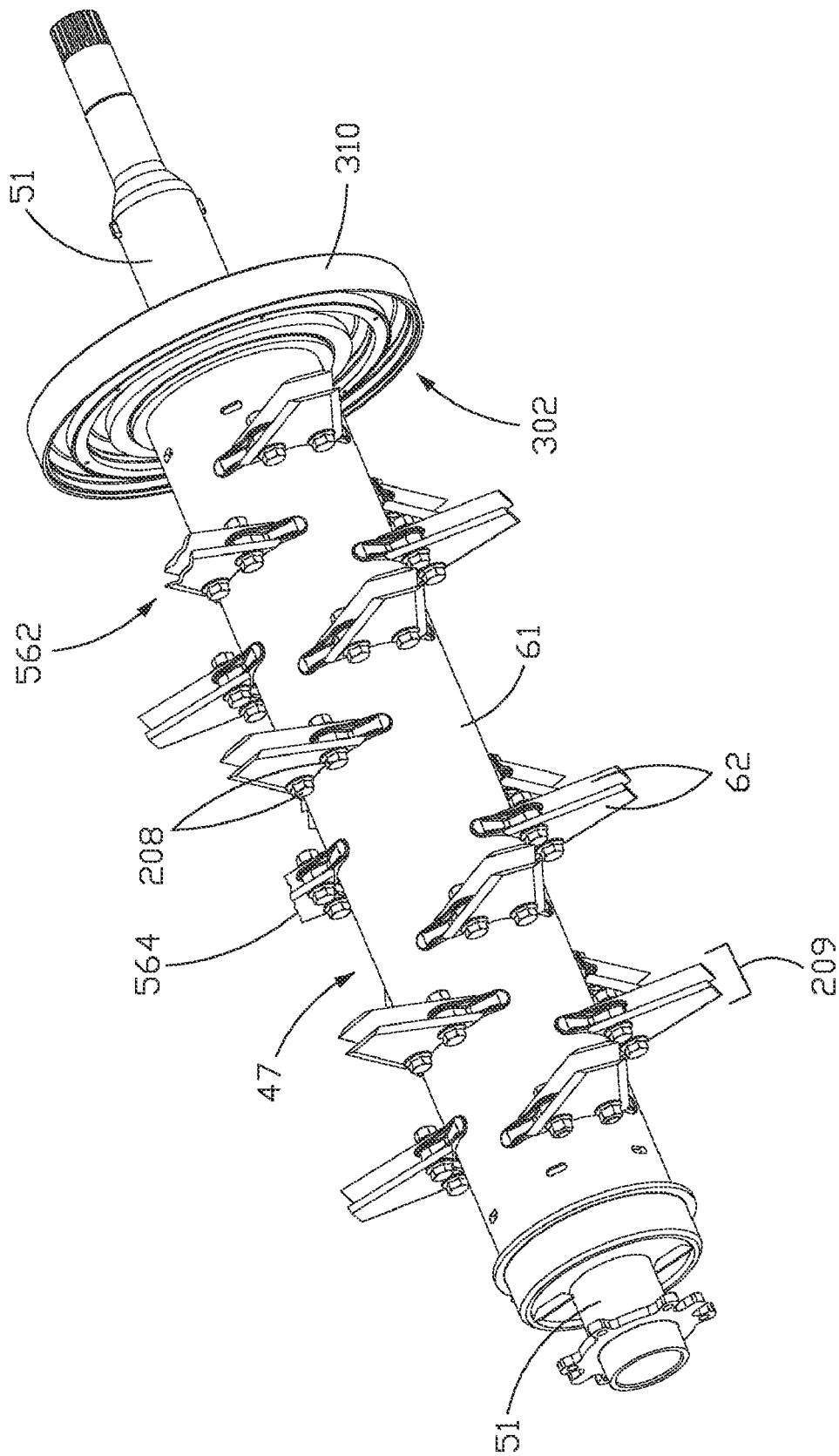
FIG. 11 illustrates a perspective view of the rotary element from the integral chopper assembly of FIG. 3 having broken knife blades and including one externally mounted auto-balance assembly according to at least one embodiment of the present invention.

FIG. 11 illustrates a perspective view of the rotary element alone from the integral chopper assembly of FIG. 3 having broken knife blades and including only one externally mounted auto-balance assembly according to at least one embodiment of the present invention. As shown in FIG. 11, and as in some embodiments, only the foreground auto-balance assembly 310 is shown mounted to one end of the rotary member 61. As shown in FIG. 11, a near-distance-from-foreground auto-balance assembly broken blades 562 are shown near or in proximity to the foreground auto-balance assembly 310. Also shown is a far-distance-from-foreground auto-balance assembly broken blades 564 at a further distance from the foreground auto-balance assembly 310 than the near-distance-from-background auto-balance assembly broken blades 562 from the foreground auto-balance assembly 310.

Figure 12:
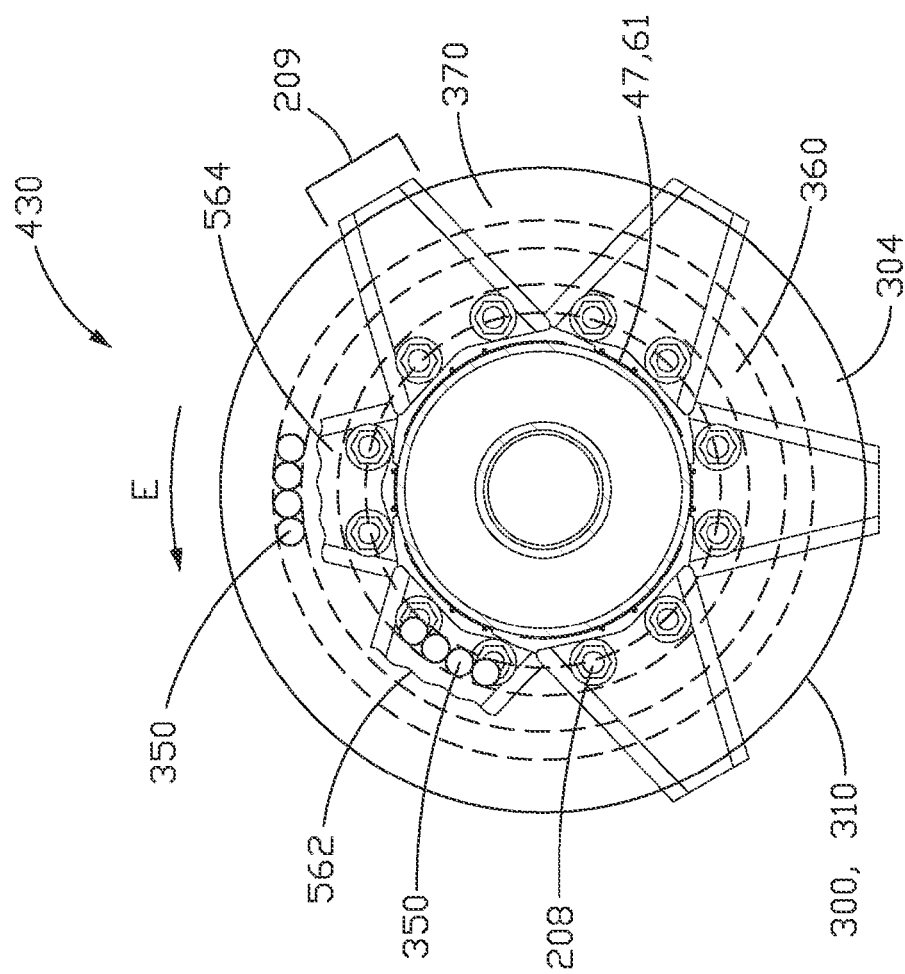
FIG. 12 illustrates an end view of the rotary element with the foreground auto-balance assembly shown with a transparent faceplate and rearplate to make visible the inner workings of the externally mounted auto-balance assembly and the blade mount assemblies in the background, in a rotary element in rotation with out-of-balance state, with the broken blades shown in FIG. 11, in at least one embodiment of the present invention.

FIG. 12 illustrates an end view of the rotary element 47 with the foreground auto-balance assembly 310 shown with a transparent faceplate 304 and rearplate 302 to make visible the inner workings of the externally mounted auto-balance assembly 300 and the blade mount assemblies 209 in the background, in a rotary element in rotation with out-of-balance state 430, with the broken blades shown in FIG. 11, in at least one embodiment of the present invention. As shown in FIG. 12, the rotary member 61 of rotary element 47 is rotating in direction E. Far-distance-from-foreground auto-balance assembly broken blades 564 are shown (see also FIG. 11). Near-distance-from-foreground auto-balance assembly broken blades 562 are also shown (see also FIG. 11). Both the near-distance-from-foreground auto-balance assembly broken blades 562 and the far-distance-from-foreground auto-balance assembly broken blades 564 cause an imbalance in loads over the rotary element 47 forming vibration along rotary member 61. As described above, it is contemplated that the spheres 350 may migrate to the point of imbalance in both inner and outer tracks simultaneously. It is also contemplated that the spheres 350 in the outer track 371 may migrate to the point of imbalance prior to the spheres 350 in the inner track 361 because they may have a higher centrifugal force acting upon them due to the greater radius of rotation. In this embodiment and as shown in FIG. 12, spheres 350 align in both tracks to compensate for offset loads for broken blades or dislodged blade mount assemblies 209 occurring at two different locations along rotary member 61.

As discussed above, one or more externally mounted auto-balance assemblies 300 may be mounted at various locations along the rotary member 61 with each externally mounted auto-balance assemblies 300 having one or more tracks with one or more spheres 350 contained within to compensate for and provide balance to the rotary element 47 including the rotary member 61 for loss mass anywhere on or about the rotary element 47. The loss of mass may be due, as described above, to broken or dislodged blade mount assemblies and/or blades.

In other embodiments, auto-balance assemblies maybe mounted or located elsewhere in relation to the rotary element 47. In some embodiments, an auto-balance assembly may be integrated or mounted internal to the rotary member 61 of the rotary element 47.

Figure 13:
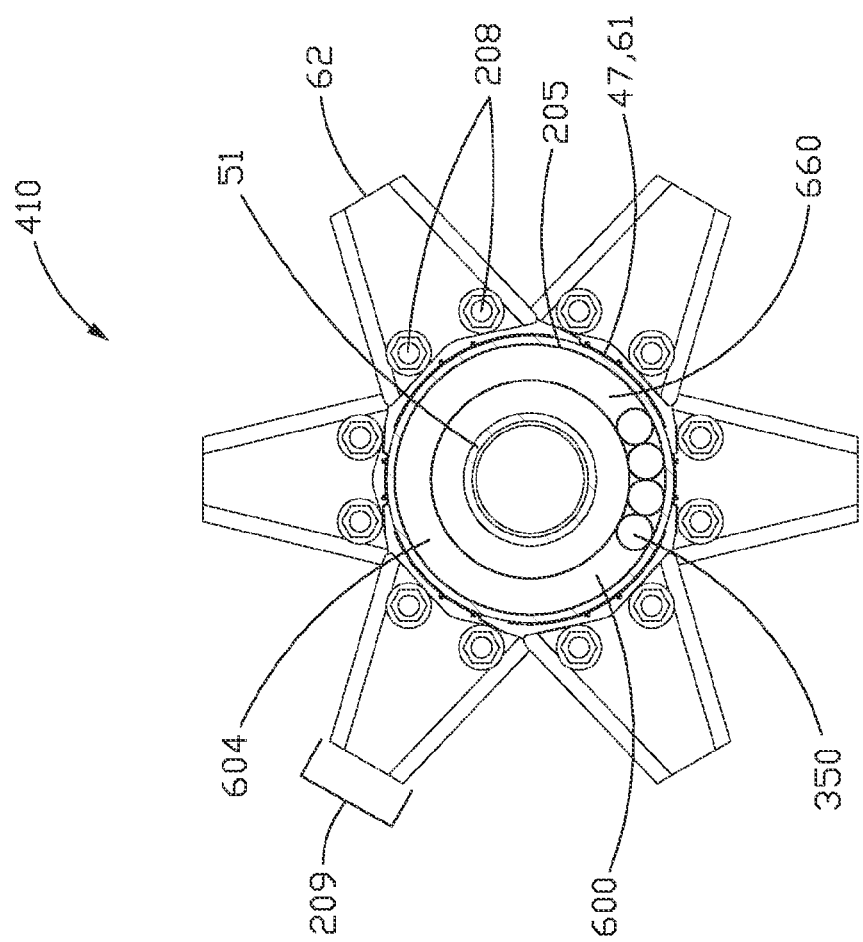
FIG. 13 illustrates an end view of the rotary element with an internally mounted auto-balance assembly inside the rotary member and showing the blade mount assemblies extending out from the circumference of the rotary element, in a rotary element at rest state, in at least one embodiment of the present invention.

FIG. 13 illustrates an end view of the rotary element 47 with an internally mounted auto-balance assembly 600 inside the rotary member 61 and showing the blade mount assemblies 209 extending out from the circumference of the rotary member 61, in a rotary element at rest state 410, in at least one embodiment of the present invention. An internally mounted auto-balance assembly face plate 604 covers the internally mounted auto-balance assembly 600 but is illustrated as transparent so as to make visible the working components within the internally mounted auto-balance assembly 600. As shown in FIG. 13, for a hollow type rotary member 61, an internally mounted auto-balance assembly 600 may be mounted at any location inside the rotary member along the X axis (see FIG. 3). The internally mounted auto-balance assemblies 600 are mounted internally so that the outside circumferential edge of the donut shaped internally mounted auto-balance assembly 600 is mounted to the internal side of surface of outer periphery 205 of rotary member 61. In this embodiment, the internally mounted auto-balance assembly 600 has only one track. In other embodiments, like the externally mounted auto-balance assembly 300, the internally mounted auto-balance assembly 600 may be of different diameter size, have one or more tracks, and have one or more spheres 350 in at least one of the one or more tracks. With the rotary element at rest state 410, the four spheres 350, shown in FIG. 13, are located at rest at the bottom of the internally mounted auto-balance assembly track 660 due to gravity.

Figure 14:
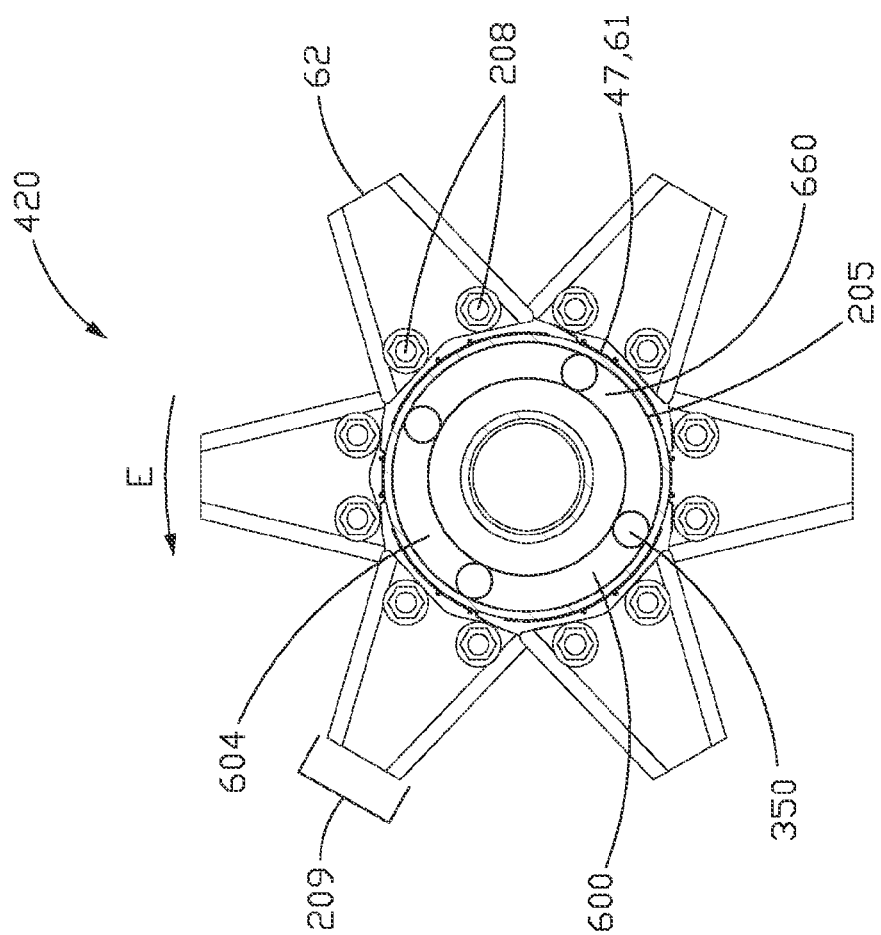
FIG. 14 illustrates the same end view of the rotary element from FIG. 13 with an internally mounted auto-balance assembly inside the rotary member and showing the blade mount assemblies extending out from the circumference of the rotary element, in a rotary element in rotation state, in at least one embodiment of the present invention.

FIG. 14 illustrates the same end view of the rotary element 47 from FIG. 13 with an internally mounted auto-balance assembly 600 inside the rotary member 61 and showing the blade mount assemblies 209 extending out from the circumference of the rotary member 61, in a rotary element in rotation state 420, in at least one embodiment of the present invention. As shown in FIG. 14, the rotary member 61 of rotary element 47 is rotating in direction E. None of the mounted assemblies 209 or knife blades 62 on the mounted assemblies 209 are shown damaged or dislodged. Thus, the rotary element 47 rotates without imbalance or vibration along rotary member 61. The spheres 350 rotating within the internally mounted auto-balance assembly track 660 rotate freely at a distance apart from each other and do not self align with the rotary element 47 balanced.

FIG. 15 illustrates the same end view of the rotary element 47 from FIG. 13 with an internally mounted auto-balance assembly 600 inside the rotary member 61 and showing the blade mount assemblies 209 extending out from the circumference of the rotary member 61 with a blade damaged, in a rotary element in rotation with out-of-balance state 430, in at least one embodiment of the present invention. As shown in FIG. 15, the rotary member 61 of rotary element 47 is rotating in direction E. Near-distance-from-foreground auto-balance assembly broken blades 610 are shown. The damage may resemble the closeness in proximity as the near-distance-from-background auto-balance assembly broken blades 464 to the background auto-balance assembly 320 in FIG. 8. The near-distance-from-foreground auto-balance assembly broken blades 610 cause an imbalance in loads over the rotary element 47 having vibration along rotary member 61. The spheres 350 rotate to align in close proximity to one another in internally mounted auto-balance assembly track 660 to generate a compensation for mass offset to the near-distance-from-foreground auto-balance assembly broken blades 610.

In other embodiments, internally mounted auto-balance assemblies 600 may be integrated with externally mounted auto-balance assemblies 300 about the rotary element 47 to compensate for mass offset due to mass loss on or about the rotary element 47.

In other embodiments, the internally mounted auto-balance assemblies 600 and/or externally mounted auto-balance assemblies 300 may be used in hood-mounted choppers as well as integral choppers. Hood-mounted choppers may be mounted at the rear and external of an agricultural machine such as a combine. The internally mounted auto-balance assemblies 600 and/or externally mounted auto-balance assemblies 300 may be fixed or integrated on other various types of choppers and/or other rotating members. The internally mounted auto-balance assemblies 600 and/or externally mounted auto-balance assemblies 300 may be fixed or integrated on threshing rotors, conventional threshing cylinders, or discharge beaters. The other types of rotors also have potential for mass loss since elements may be damaged or dislodged since the elements are attached to the rotors (e.g. bolted on). For example, a cylindrical threshing rotor 28 (see FIG. 1) may lose or have damaged threshing mass elements 23 creating mass loss and potential imbalance on the cylindrical threshing rotor 28.

In other embodiments, internally mounted auto-balance assemblies 600 and/or externally mounted auto-balance assemblies 300 may compensate for mass offset and imbalance when any type of mass element is removed from the rotary element 47, other than the blade mount assemblies 209 (see FIG. 3).

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A rotary element of a combine harvester comprising:
a rotary member, wherein the rotary member is generally cylindrical and elongated and rotates during operation;
one or more blade mount assemblies mounted to a surface about a circumference of the rotary member, wherein the one or more blade mount assemblies comprise:
a lug attached to the surface of the rotary member; and
one or more blades, wherein each of the one or more blades are attached by one or more nut and bolt assemblies from a base of the blade to the lug and wherein one or more edges of the blade extend up from the base of the blade and away from the lug to meet at a tip of the blade;
one or more auto-balance assemblies mounted to the rotary member to compensate for a mass offset on the rotary element due to the one or more blade mount assemblies being dislodged or broken, wherein the one or more auto-balance assemblies comprise:
one or more tracks running parallel in circumference to an attachment of the one or more auto-balance assemblies with the rotary member, wherein the track is located at a particular radial distance from the attachment of the balance assembly with the rotary member and wherein each track comprises:
a first bearing race edge attached to the rotary member;
a second bearing race edge attached to the rotary member; and
one or more spheres located inside the one or more tracks and in contact with the first bearing race edge and the second bearing race edge and wherein loads are transferred from at least one of the first bearing race edge and the second bearing race edge, when the rotary member rotates, to the one or more spheres and wherein the one or more spheres self-align within the track to compensate for the mass offset on the rotary element.

2. The rotary element of claim 1, wherein the rotary element is a part of an integral chopper assembly.

3. The rotary element of claim 1, wherein the rotary element is a part of a hood-mounted chopper assembly.

4. The rotary element of claim 1, wherein the one or more auto-balance assemblies are donut shaped.

5. The rotary element of claim 4, wherein the one or more auto-balance assemblies are mounted from an outside circumferential edge of the donut shaped auto-balance assembly to an internal side of the surface about the circumference of the rotary member, wherein the rotary member is hollow within the cylinder.

6. The rotary element of claim 4, wherein the one or more auto-balance assemblies are mounted from an inside circumferential edge of the donut shape to an external side of the surface about the circumference of the rotary member.

7. The rotary element of claim 4, wherein the one or more auto-balance assemblies is mounted to the rotary member by at least one of: one or more bolts; a press fit; and an adherent substance.

8. The rotary element of claim 4, wherein the track comprises a viscous film for the one or more spheres to move freely within the track without drag or without displacement of the track.

9. The rotary element of claim 4, wherein a composition of the one or more spheres are selected from at least one of: stainless steel; chrome steel; or ceramic.

10. The rotary element of claim 1, wherein the one or more spheres are replaced with one or more liquid masses.

11. The rotary element of claim 10, wherein the one or more liquid masses comprise oil and wherein the one or more tracks enclose water for the one or more liquid masses to freely move within the track enclosing water.

12. The rotary element of claim 1, wherein the compensation of mass offset is greater when the radial distance is larger.

13. A rotary element balancing system of a combine comprising:
- a rotary element, wherein the rotary element is generally cylindrical and elongated and rotates during operation;
- one or more mass elements bolted to a surface about a circumference of the rotary element, wherein the one or more mass elements are arranged on the surface of the rotary element and wherein the rotary element is balanced with the arrangement of mass elements when the rotary element rotates;
- one or more auto-balance assemblies mounted to the rotary element to compensate for a mass loss offset and imbalance about the rotary element due to a removal or a brake of the one or more mass elements, wherein the one or more auto-balance assemblies comprise:
- a disc member having a unitary structure, the disc member comprising:
- one or more tracks running parallel in circumference to an attachment of the one or more auto-balance assemblies with the rotary element, wherein the track is located at a particular radial distance from the attachment of the balance assembly with the rotary element; and
- two bearing race edges on opposite sides of each track and attached to the rotary member; and
- one or more spheres located inside the one or more tracks and in contact with the first bearing race edge and the second bearing race edge and wherein loads are transferred from at least one of the first bearing race edge and the second bearing race edge, when the rotary member rotates, to the one or more spheres and wherein the one or more spheres self-align within the track to compensate for mass offset and imbalance on the rotary element.

14. The system of claim 13, wherein the one or more mass elements comprise one or more blade mount assemblies mounted to the surface of the rotary element and wherein the one or more blade mount assemblies comprise:
- a lug attached to the surface of the rotary member; and
- one or blades, wherein each of the one or more blades are attached by one or more nuts and bolts from the base of the one or more blades to the lug and wherein the one or more edges of the blade extend up from the base of the blade and away from the lug to meet at a tip of the blade.

15. The system of claim 13, wherein the rotary element is a chopping rotary element.

16. The system of claim 13, wherein the rotary element is a threshing rotary element.

17. The system of claim 13, wherein two auto-balance assemblies are mounted at opposing ends of the rotary element.

18. The system of claim 13, wherein the one or more auto-balance assemblies are donut shaped.

19. The system of claim 18, wherein at least one of the one or more auto-balance assemblies are mounted from an outside circumferential edge of the donut shaped auto-balance assembly to an internal side surface about the circumference of the rotary element, wherein the rotary element is hollow inside the cylinder, and wherein at least one of the one or more auto-balance assemblies are mounted from an inside circumferential edge of the donut shape to an external side of the surface of about the circumference the rotary member.

20. The system of claim 13, wherein the one or more tracks comprise no spheres.

* * * * *